US009497011B2

(12) United States Patent
Gao et al.

(10) Patent No.: US 9,497,011 B2
(45) Date of Patent: Nov. 15, 2016

(54) CARRIER AGGREGATION FEEDBACK METHOD, DEVICE AND SYSTEM FOR DIFFERENT TDD UPLINK/DOWNLINK CONFIGURATIONS

(71) Applicant: CHINA ACADEMY OF TELECOMMUNICATIONS TECHNOLOGY, Beijing (CN)

(72) Inventors: Xuejuan Gao, Beijing (CN); Yanan Lin, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 71 days.

(21) Appl. No.: 14/398,970

(22) PCT Filed: May 2, 2013

(86) PCT No.: PCT/CN2013/075081
§ 371 (c)(1),
(2) Date: Nov. 4, 2014

(87) PCT Pub. No.: WO2013/163953
PCT Pub. Date: Nov. 7, 2013

(65) Prior Publication Data
US 2015/0117272 A1    Apr. 30, 2015

(30) Foreign Application Priority Data
May 4, 2012 (CN) .......................... 2012 1 0137097

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1861* (2013.01); *H04L 5/001* (2013.01); *H04L 5/14* (2013.01); *H04L 5/1469* (2013.01); *H04W 72/0413* (2013.01); *H04L 1/1854* (2013.01)

(58) Field of Classification Search
None
See application file for complete search history.

(56) References Cited

U.S. PATENT DOCUMENTS

2010/0150081 A1* 6/2010 Gao .................... H04L 1/1621
370/329
2011/0059767 A1* 3/2011 Parkvall ............... H04L 1/1635
455/550.1
(Continued)

FOREIGN PATENT DOCUMENTS

CN    101795177 A    8/2010
CN    102088341 A    6/2011
(Continued)

OTHER PUBLICATIONS

PCT International Search Report for PCT Counterpart Application No. PCT/CN2013/075081, 5 pages, (Aug. 8, 2013).
(Continued)

*Primary Examiner* — Gary Mui
(74) *Attorney, Agent, or Firm* — Blakely, Sokoloff, Taylor & Zafman LLP

(57) ABSTRACT

Disclosed are a carrier aggregation feedback method, device and system, relating to communication technologies. The number M of subframes requiring ACK/NACK feedback in a current uplink subframe is determined according to a TDD uplink/downlink configuration that corresponds to each carrier and is used for determining a timing relationship based on which a UE reports ACK/NACK feedback information of the carrier, and then ACK/NACK feedback information transmitted by a terminal device in the current uplink subframe and a candidate channel resource used for channel selection are determined according to the value of M, so as to transmit the ACK/NACK feedback information in the candidate channel resource by using PUCCH format 1b in combination with channel selection.

20 Claims, 4 Drawing Sheets

(51) Int. Cl.
*H04L 5/14* (2006.01)
*H04W 72/04* (2009.01)

(56) References Cited

U.S. PATENT DOCUMENTS

| | | | |
|---|---|---|---|
| 2011/0141878 A1* | 6/2011 | Che | H04L 1/0025 370/216 |
| 2012/0218881 A1* | 8/2012 | Liang | H04L 1/1861 370/216 |
| 2012/0320805 A1 | 12/2012 | Yang et al. | |
| 2013/0077596 A1* | 3/2013 | Liang | H04L 1/0031 370/329 |
| 2013/0170407 A1* | 7/2013 | Liang | H04L 1/1607 370/280 |
| 2013/0182692 A1* | 7/2013 | Dai | H04L 1/0026 370/336 |
| 2013/0250822 A1 | 9/2013 | Yang et al. | |
| 2013/0265946 A1* | 10/2013 | Gao | H04L 1/1854 370/329 |

FOREIGN PATENT DOCUMENTS

| | | |
|---|---|---|
| CN | 102237991 A | 11/2011 |
| JP | 2014-514842 A | 6/2014 |
| KR | 10-2013-0032860 A | 4/2013 |
| WO | WO 2012/024181 A1 | 2/2012 |
| WO | WO 2012/044115 A2 | 4/2012 |
| WO | WO 2012/091443 A2 | 7/2012 |
| WO | WO 2013/043024 A1 | 3/2013 |

OTHER PUBLICATIONS

PCT Written Opinion of the International Searching Authority for PCT Counterpart Application No. PCT/CN2013/075081, 19 pages, (Aug. 8, 2013).
European Patent Office Communication enclosing Extended European Search Report for corresponding European Patent Application No. 13784179.7, 8 pp., (Mar. 26, 2015).
PCT Notification concerning Transmittal of International Preliminary Report on Patentability (Chapter I of the Patent Cooperation Treaty) for PCT Counterpart Application No. PCT/CN2013/075081, 22 pp., (Nov. 13, 2014).
Office Action for corresponding Japanese Patent Application No. 2015-509292, 7 pp., (Nov. 2, 2015).
European Patent Office Communication enclosing Office Action for corresponding European Patent Application No. 13784179.7, 6 pp., (Mar. 26, 2016).

* cited by examiner

--Prior Art--

--Prior Art--

CARRIER AGGREGATION FEEDBACK METHOD, DEVICE AND SYSTEM FOR DIFFERENT TDD UPLINK/DOWNLINK CONFIGURATIONS

CROSS-REFERENCE TO RELATED APPLICATIONS

This patent application is a U.S. National Stage Application under 35 U.S.C. §371 of International Application No. PCT/CN2013/075081, filed on May 2, 2013, entitled CARRIER AGGREGATION FEEDBACK METHOD, DEVICE AND SYSTEM FOR DIFFERENT TDD UPLINK/DOWNLINK CONFIGURATIONS, designating the United States, and claiming priority of Chinese Patent Application No. 201210137097.1, filed with the Chinese Patent Office on May 4, 2012, and entitled "Feedback method of and apparatus and system for aggregating carriers with different TDD uplink/downlink configurations", the content of which was incorporated by reference in its entirety.

FIELD

The present invention relates to the field of communications and particularly to a feedback method of and apparatus and system for aggregating carriers with different TDD uplink/downlink configurations.

BACKGROUND

Inter-band carrier aggregation is supported in a Long Term Evolution-Advanced, LTE-A, Release-11, Rel-11, Carrier Aggregation, CA, system. In order to avoid mutual interference between Time Division Duplexing, TDD, systems at adjacent frequencies, different TDD uplink/downlink configurations may be used for cells or Component Carriers, CCs, in different bands.

In the LTE-A system, there are required peak rates of the system, up to 1 Gbps in the downlink and 500 Mbps in the uplink, as significantly improved over a Long Term Evolution, LTE, system. It is thus necessary in the LTE-A system to extend a bandwidth available to a User Equipment, UE, that is, a plurality of consecutive or inconsecutive carriers served by the same evolved Node B, eNB are aggregated together to serve the UE concurrently for a desirable rate, as illustrated in FIG. 1. Each of the carriers aggregated together can be referred to as a component carrier, each cell can be a component carrier, and cells (component carriers) served by different eNBs can not be aggregated. In order to ensure the UE in the LTE system to be able to operate over each of the aggregated carriers, a bandwidth of each of the component carriers is no more than 20 MHz.

Carrier aggregation can be further categorized into intra-band CA and inter-band CA dependent upon the bands of the aggregated carriers, and in inter-band CA systems of the Rel-11 and later, different TDD uplink/downlink configurations can be used for cells in different bands in order to avoid interference to other TDD systems.

As illustrated in FIG. 2, a carrier 1 and a carrier 2 are in a band A, whereas a carrier 3 is in a band B, and a cell 1, a cell 2 and a cell 3 are cells respectively over the carrier 1, the carrier 2 and the carrier 3. TDD uplink/downlink configurations of the cell 1 and the cell 2 are the same, e.g., the uplink/downlink configuration 1, and a TDD uplink/downlink configuration of the cell 3 is different from those of the cell 1 and the cell 2, e.g., the uplink/downlink configuration 2. When the carriers are aggregated for the UE in these three cells, such a situation may arise that the TDD uplink/downlink configurations of the cells aggregated for the UE are different.

In the LTE system, a radio frame is defined as 10 ms including ten sub-frames, each of which is 1 ms. Seven TDD uplink/downlink configurations are defined for each TDD radio frame, as depicted in Table 1, where D represents a downlink sub-frame, U represents an uplink sub-frame, and S represents a special sub-frame of the TDD system. The special sub-frame includes a Downlink Pilot Time Slot, DwPTS, a Guard Period, GP, and an Uplink Pilot Time Slot, UpPTS.

TABLE 1

Uplink/downlink configurations of the TDD system

| Uplink/downlink configuration | Sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The UE in the LTE-A TDD system needs to feed back ACK/NACK feedback information of a plurality of downlink carriers and downlink sub-frames in the same uplink sub-frame. Particularly the number of sub-frames for which the UE needs to feed back ACK/NACK in the same uplink sub-frame can be defined as M, where M takes different values in different uplink sub-frames and different uplink/downlink configurations, as depicted in Table 2, where a set of sub-frames for which ACK/NACK is fed back in the uplink sub-frame n includes sub-frames indexed n-k, and k represents the values in the set of $\{k_0, k_1, \ldots, k_{M-1}\}$ corresponding to the uplink sub-frame indexed n in Table 2.

TABLE 2

A set of indexes of downlink sub-frames corresponding to the uplink sub-frame in the TDD system, K: $\{k_0, k_1, \ldots k_{M-1}\}$

| Uplink/downlink configuration | Sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 2-continued

A set of indexes of downlink sub-frames corresponding to the uplink sub-frame in the TDD system, K: $\{k_0, k_1, \ldots k_{M-1}\}$

| Uplink/downlink configuration | Sub-frame index n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the LTE-A system, a Physical Uplink Control Channel, PUCCH, is transmitted only over a primary component carrier, and 2/3/4-bit ACK/NACK information can be transmitted through a scheme of PUCCH format 1b with channel selection, where different ACK/NACK feedback information states are distinguished by the UE selecting channel for transmission among a plurality of candidate channel resources. Particularly a mapping table is defined respectively for transmission of 2, 3 or 4-bit ACK/NACK to map the different ACK/NACK information state to be fed back to real transmission information (i.e. one of four Quadrature Phase-Shift Keying, QPSK, constellation points transmitted by PUCCH format 1b) and the transmission channel resources. 2, 3 and 4 PUCCH format 1a/1b channel resources are required respectively for the 2, 3 and 4-bit ACK/NACK feedback information in a transmission mode via a single antenna port.

In the LTE-A TDD system, since transmission of at most 4 bits of ACK/NACK information is supported in the scheme of PUCCH format 1b with channel selection, the use of this scheme to transmit ACK/NACK information is supported at present only for the UE for which no more than two carriers are aggregated, and when the UE needs to feed back more than 4 bits ACK/NACK in an uplink sub-frame, the ACK/NACK information needs to be bundled to lower the number of bits of the ACK/NACK feedback information, and a particular transmission scheme is as follows:

A. With M=1 or 2 corresponding to the current uplink sub-frame n:

With M=1, no spatial bundling is required for multi-codeword ACK/NACK; in a transmission mode configured for two aggregated carriers, A=2 bits of ACK/NACK information needs to be fed back when both of the carriers are in a uni-codeword transmission mode, A=3 bits of ACK/NACK information needs to be fed back when one of the carriers is in a multi-codeword transmission mode and the other carrier is in the uni-codeword transmission mode, and A=4 bits of ACK/NACK information needs to be fed back when both of the carriers are in the multi-codeword transmission mode; and a mapping relationship of a sequence of ACK/NACK information to be fed back generated by the UE HARQ-ACKju0), . . . , HARQ-ACK(j), . . . HARQ-ACK(A−1) to respective transport blocks/sub-frames and downlink carriers is as depicted in Table 3, where $0 \leq j \leq A-1$, $A \in [2,3,4]$, and the UE generates NACK/DTX as feedback information for respective transport blocks/sub-frames in which no data is received; and the UE maps PUCCH resources corresponding to the respective carriers (cells) into A PUCCH resources in an ascending order of j in Table 3.

TABLE 3

A mapping relationship of a sequence of ACK/NACK information to be fed back to respective transport blocks/sub-frames and downlink carriers with M = 1 (mapping of transport blocks and serving cells to HARQ-ACK(j) for PUCCH format 1b HARQ-ACK channel selection with M = 1)

| A | HARQ-ACK(j) | | | |
|---|---|---|---|---|
| | HARQ-ACK(0) | HARQ-ACK(1) | HARQ-ACK(2) | HARQ-ACK(3) |
| 2 | TB1 Primary cell | TB2 Secondary cell | NA | NA |
| 3 | TB1 Serving cell1 | TB2 Serving cell1 | TB3 Serving cell2 | NA |
| 4 | TB1 Primary cell | TB2 Primary cell | TB3 Secondary cell | TB4 Secondary cell |

With M=2, spatial bundling is required for multi-codeword ACK/NACK, and the UE feeds back A=4 bits of ACK/NACK information all the time; and a mapping relationship of a sequence of ACK/NACK information to be fed back generated by the UE HARQ-ACK(0), . . . , HARQ-ACK(j), . . . HARQ-ACK(A−1) to respective sub-frames and downlink carriers is as depicted in Table 4, where $0 \leq j \leq A-1$, $A=4$, and the UE generates NACK/DTX as feedback information for respective sub-frames in which no data is received; and the UE maps PUCCH resources corresponding to the respective carriers (cells) into A PUCCH resources in an ascending order of j in Table 4.

TABLE 4

A mapping relationship of a sequence of ACK/NACK information to be fed back to respective sub-frames over respective carriers with M = 2 (mapping of sub-frames on respective serving cells to HARQ-ACK(j) for PUCCH format 1b HARQ-ACK channel selection for TDD with M = 2)

| A | HARQ-ACK(j) | | | |
|---|---|---|---|---|
| | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

In order to make a feedback, the channel resources $n_{PUCCH,i}^{(1)}$, $0 \leq i \leq A-1$ need to be determined particularly as follows: for an SPS PDSCH, a semi-static PUCCH format 1b resource is determined from a Transmit Power Control, TPC, field in a PDCCH instructing the SPS PDSCH to be activated; for a Physical Downlink Shared Channel, PDSCH, with a corresponding Physical Downlink Control Channel, PDCCH, or a PDCCH instructing a Semi-Persistent Scheduling, SPS, resource to be released, transmitted over a primary component carrier, an implicit PUCCH format 1b resource is determined from the lowest Control Channel Element, CCE, index occupied by the PDCCH, and with M=1 and in the multi-codeword transmission mode, another implicit PUCCH format 1b resource is further determined from the CCE+1 in correspondence to the second Transport Block, TB, in the sub-frame; and for a PDSCH transmitted over a secondary component carrier, if its corresponding PDCCH is transmitted over the primary component carrier, then again an implicit PUCCH format 1b resource is determined from the lowest CCE of the PDCCH, and with M=1 and in the multi-codeword transmission mode, another implicit PUCCH format 1b resource is further determined from the CCE+1 in correspondence to the TB2, whereas if its corresponding PDCCH is transmitted over a secondary component carrier, then a set of semi-statically configured PUCCH format 1b resources is determined from a TPC field in the PDCCH (with M=1 and in the multi-codeword transmission mode, or with M=2, each set of resources includes two resources; otherwise, each set of resources includes one resource);

With M=1 or 2 corresponding to the sub-frame n above, the UE refers to the ACK/NACK mapping table with A=2, 3 or 4 (see Tables 10.1.3.2-1, 10.1.3.2-2 and 10.1.3.2-3 in TS36.213, Section 10.1.3.2) by the current sequence of ACK/NACK information to be fed back HARQ-ACK (0), ..., HARQ-ACK(j), ..., HARQ-ACK(A−1) and transmits corresponding PUCCH format 1b carried information $b(0)b(1)$ over a PUCCH resource $n_{PUCCH}^{(1)}$ selected among the A PUCCH resources $n_{PUCCH,i}^{(1)}$ by using PUCCH format 1b, where $0 \leq i \leq A-1$, $A \in [2,3,4]$.

B. With M=3 or 4 corresponding to the current uplink sub-frame n:

Spatial bundling is required for multi-codeword ACK/NACK, but the spatially-bundled feedback information bits are still more than four bits and need to be bundled in the time domain, where under the principle of time-domain bundling, 2 bits of bundled information corresponding to each downlink carrier represents the number of sub-frames received consecutively and correctly starting with a first scheduled sub-frame over the downlink carrier, that is, the UE generates for each downlink carrier a sequence of M-bit ACK/NACK information to be fed back HARQ-ACK (0), ..., HARQ-ACK(j), ..., HARQ-ACK(M−1), for which $n_{PUCCH,i}^{(1)}$ PUCCH format 1b resources are occupied, where $0 \leq j \leq M-1$, $0 \leq i \leq 3$; and the UE generates NACK/DTX as feedback information for respective sub-frames in which no data is received.

For a primary component carrier, if there is an SPS PDSCH, then its feedback information is mapped to HARQ-ACK(0), and its corresponding PUCCH format 1b resource is mapped to $n_{PUCCH,0}^{(1)}$, and the remaining HARQ-ACK(j) with $1 \leq j \leq M-1$ represents feedback information of a downlink sub-frame corresponding to a PDCCH with the Downlink Assignment index, DAI, value of "j" transmitted over the primary component carrier, and $n_{PUCCH,i}^{(1)}$ represents an implicit PUCCH format 1b resource derived from the lowest CCE of a PDCCH with the DAI value of 1; or if there is no SPS PDSCH, then HARQ-ACK(j) with $0 \leq j \leq M-1$ represents feedback information of a downlink sub-frame corresponding to a PDCCH with the DAI value of "j+1" transmitted over a primary cell, and $n_{PUCCH,0}^{(1)}$ and $n_{PUCCH,1}^{(1)}$ represent implicit PUCCH format 1b resources derived from the lowest CCEs of PDCCHs with the DAI values of 1 and 2 respectively.

For a secondary component carrier, HARQ-ACK(j) with $0 \leq j \leq M-1$ represents feedback information of a downlink sub-frame corresponding to a PDCCH with the DAI value of "j+1" transmitted over the secondary component carrier, and when a PDCCH scheduling a secondary component carrier is transmitted over a primary component carrier, $n_{PUCCH,2}^{(1)}$ and $n_{PUCCH,3}^{(1)}$ represent PUCCH format 1b resources derived from the lowest CCE indexes of PDCCHs, with the DAI values of 1 and 2, scheduling data over the secondary component carrier, respectively; and when a PDCCH scheduling a secondary component carrier is transmitted over a secondary component carrier, $n_{PUCCH,2}^{(1)}$ and $n_{PUCCH,3}^{(1)}$ represent PUCCH format 1b resource determined from ACK/NACK resource indication information carried by TPC fields in PDCCHs, with the DAI values of 1 and 2, scheduling data over the secondary component carrier, respectively, where the indication information indicates one of a plurality of sets of channel resources preconfigured for the UE in higher-layer signaling, and each set of channel resources includes at least two PUCCH format 1b resources.

The UE refers to the corresponding ACK/NACK mapping table with M=3 or 4 for time-domain bundling (see Tables 10.1.3.2-5 and 10.1.3.2-6 in TS36.213, Section 10.1.3.2) by the sequences of ACK/NACK information to be fed back corresponding respectively to the primary component carrier and the secondary component carriers and transmits corresponding PUCCH format 1b carried information $b(0)b(1)$ over a PUCCH resource $n_{PUCCH}^{(1)}$ selected among the M PUCCH resources $n_{PUCCH,i}^{(1)}$ using PUCCH format 1b, where $0 \leq j \leq M-1$, $M \in [3,4]$.

Since only transmission of a PUCCH over a Primary Component Carrier, PCC, is supported, when different TDD uplink/downlink configurations are used for two carriers aggregated for the UE, the direction of a sub-frame with the same index may be different over a Secondary Component Carrier, SCC, from the direction thereof over a PCC. In order to ensure transmission of ACK/NACK feedback information of a downlink sub-frame over a secondary component carrier, a timing relationship for the UE to report ACK/NACK feedback information of downlink data of the secondary component carrier (simply a DL HARQ timing) needs to be determined again, and this timing relationship is a correspondence relationship of ACK/NACK feedback information of a downlink sub-frame over the secondary component carrier to an uplink sub-frame in which ACK/NACK feedback information of the downlink sub-frame is transmitted, so that ACK/NACK feedback information of the downlink sub-frame over the secondary component carrier can be transmitted in the uplink sub-frame over the primary component carrier. At this time an uplink sub-frame for an ACK/NACK feedback corresponding to a downlink sub-frame of the secondary component carrier may be determined for the secondary component carrier in a reference TDD uplink/downlink configuration and a correspondence relationship of downlink sub-frames to uplink sub-frames in the reference TDD uplink/downlink configuration (e.g., the set of k in the reference TDD uplink/downlink configuration in Table 2). The reference TDD uplink/downlink configuration may be the same as a TDD uplink/downlink configuration configured for the secondary component carrier in a System Information Block 1, SIB1, or may be the same as a TDD uplink/downlink configuration configured for the primary component carrier in the SIB1 or may be one of other existing uplink/downlink configurations different from both of the TDD uplink/downlink configurations configured for the primary component carrier and the secondary component carrier in the SIB1. At this time there may be different corresponding sets of sub-frames, transmitted over the primary component carrier and the secondary component carrier, for which ACK/NACK is fed back in the uplink sub-frame n of the primary component carrier and thus different numbers of sub-frames (numbers of bits of ACK/NACK feedback), over the primary component carrier and the secondary component carrier, for which ACK/NACK is fed back in the uplink sub-frame n, so there is no directly corresponding ACK/NACK mapping table; and when a PDSCH over the secondary component carrier is scheduled by a PDCCH transmitted over the primary component carrier, an implicit channel resource derived from the lowest CCE of the PDCCH may conflict with another sub-frame and/or another UE, so the scheme of PUCCH format 1b with channel selection in the Rel-10 can not be reused here.

As can be apparent, there has been absent so far a definite solution for feeding back ACK/NACK in aggregation of carriers with different uplink/downlink configurations.

SUMMARY

Embodiments of the invention provide a feedback method of and apparatus and system for aggregating carriers so as to transmit ACK/NACK by using PUCCH format 1b with channel selection for aggregation of carriers with different uplink/downlink configurations or for aggregation of FDD and TDD carriers.

A feedback method of aggregating carriers, the method including:

determining, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to the each carrier include at least two TDD uplink/downlink configurations, or the respective carriers include at least one Frequency Division Duplexing, FDD, carrier and at least one TDD carrier, and the TDD uplink/downlink configuration is used for determining a timing relationship for a User Equipment, UE, to report ACK/NACK feedback information of the carrier;

determining, from a value of M, ACK/NACK feedback information to be transmitted in the current uplink sub-frame;

determining, from the value of M, candidate channel resources for channel selection; and transmitting the ACK/NACK feedback information in a Physical Uplink Control Channel, PUCCH, format 1b with channel selection over the candidate channel resources.

A feedback method of aggregating carriers, the method including:

determining, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from TDD uplink/downlink configurations corresponding to the respective carriers, wherein the TDD uplink/downlink configurations, configured in system information, corresponding to each carriers include at least two TDD uplink/downlink configurations, or the respective carriers include at least one Frequency Division Duplexing, FDD, carrier and at least one TDD carrier, and the TDD uplink/downlink configuration is used for determining a timing relationship for a base station to receive ACK/NACK feedback information of the carrier;

determining, from a value of M, candidate channel resources for channel selection; and receiving ACK/NACK feedback information by PUCCH format 1b with channel selection over the candidate channel resources.

A feedback apparatus for aggregating carriers, the method including:

a number of sub-frames determining unit configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to each carrier include at least two TDD uplink/downlink configurations, or the respective carriers include at least one Frequency Division Duplexing, FDD, carrier and at least one TDD carrier, and the TDD uplink/downlink configuration is used for determining a timing relationship for a UE to report ACK/NACK feedback information of the carrier;

a feedback information determining unit configured to determine, from a value of M, ACK/NACK feedback information to be transmitted in the current uplink sub-frame;

a channel resource determining unit configured to determine, from the value of M, candidate channel resources for channel selection; and a transmitting unit configured to transmit the ACK/NACK feedback information by PUCCH format 1b with channel selection over the candidate channel resources.

A feedback apparatus for aggregating carriers, the method including:

a number of feedback sub-frames determining unit configured to determine, from Time Division Duplexing, TDD, uplink/downlink configurations corresponding to respective carriers, that the number M of sub-frames for which ACK/NACK needs to be fed back in the current uplink sub-frame is a largest one of the numbers of sub-frames, for which ACK/NACK needs to be fed back in a current uplink sub-frame for the respective carriers, determined from the TDD uplink/downlink configurations corresponding to the respective carriers, wherein the TDD uplink/downlink configurations, configured in system information, corresponding to each carrier include at least two TDD uplink/downlink configurations, or the respective carriers include at least one Frequency Division Duplexing, FDD, carrier and at least one TDD carrier, and the TDD uplink/downlink configuration is used for determining a timing relationship for a base station to receive ACK/NACK feedback information of the carrier;

a candidate channel resource determining unit configured to determine, from a value of M, candidate channel resources for channel selection; and a receiving unit configured to receive ACK/NACK feedback information by PUCCH format 1b with channel selection over the candidate channel resources.

A feedback system for aggregating carriers, the method including:

a UE configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to each carrier include at least two TDD uplink/downlink configurations, or the respective carriers include at least one Frequency Division Duplexing, FDD, carrier and at least one TDD carrier, and the TDD uplink/downlink configuration is used for determining a timing relationship for a UE to report ACK/NACK feedback information of the carrier; to determine, from a value of M, ACK/NACK feedback information to be transmitted in the current uplink sub-frame; to determine, from the value of M, candidate channel resources for channel selection; and to transmit the ACK/NACK feedback information by PUCCH format 1b with channel selection over the candidate channel resources; and a base station configured to determine, from TDD uplink/downlink configurations corresponding to respective carriers, that the number M of sub-frames for which ACK/NACK needs to be fed back in the current uplink sub-frame is a largest one of the numbers of sub-frames, for which ACK/NACK needs to be fed back in the current uplink sub-frame for the respective carriers, determined from the TDD uplink/downlink configurations corresponding to the respective carriers; to determine, from the value of M, the candidate channel resources for channel selection; and to receive the ACK/NACK feedback information by PUCCH format 1b with channel selection over the candidate channel resources.

The embodiments of the invention provide a feedback method of and apparatus and system for aggregating carriers, where the number M of sub-frames for which ACK/NACK needs to be fed back in the current uplink sub-frame is determined from TDD uplink/downlink configurations, corresponding to the respective carriers, by which timing relationships for a UE to report ACK/NACK feedback information of the carriers are determined, and ACK/NACK feedback information transmitted by the UE in the current uplink sub-frame and candidate channel resources for channel selection are further determined from the value of M, and furthermore the ACK/NACK feedback information is transmitted by PUCCH format 1b with channel selection over the candidate channel resources.

DETAILED DESCRIPTION OF THE EMBODIMENTS

Embodiments of the invention provide a feedback method of and apparatus and system for aggregating carriers, wherein it is determined, from TDD uplink/downlink configurations, corresponding to a PCC and an SCC, which are configured for determining a timing relationship to report ACK/NACK, that the number M of downlink sub-frames for which ACK/NACK needs to be fed back in the current uplink sub-frame is the largest one of the numbers of sub-frames, for which ACK/NACK needs to be fed back in the current uplink sub-frame, determined from the TDD uplink/downlink configurations corresponding to the PCC and the SCC respectively, and ACK/NACK feedback information transmitted from a UE in the current uplink sub-frame and candidate channel resources for channel selection are further determined from the value of M, and the ACK/NACK feedback information is transmitted through channel selection over the candidate channel resources to perform the transmission of ACK/NACK by PUCCH format 1b with channel selection.

For an LTE-A CA UE for which carriers with different uplink/downlink configurations are aggregated, ACK/NACK is transmitted by PUCCH format 1b with channel selection in a feedback method according to an embodiment of the invention, where the value of M corresponding to the current uplink sub-frame n is determined from uplink/downlink configurations corresponding to DL HARQ timings of a PCC and an SCC, M represents the larger one of $M_P$ and $M_S$, $M_P$ represents the number of sub-frames, for which ACK/NACK needs to be fed back, corresponding to the sub-frame n, determined from a TDD uplink/downlink configuration corresponding to the DL HARQ timing of the PCC (i.e., a TDD uplink/downlink configuration of the PCC configured in SIB1 information), and $M_S$ represents the number of sub-frames, for which ACK/NACK needs to be fed back, corresponding to the sub-frame n, determined from a TDD uplink/downlink configuration corresponding to the DL HARQ timing of the SCC.

Figure 1:
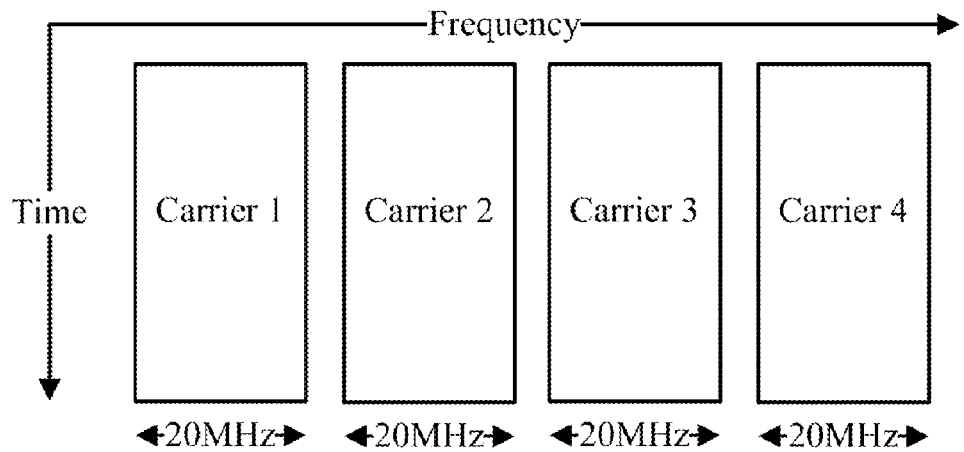
FIG. 1 is a schematic diagram of intra-band carrier aggregation in the prior art.
Figure 2:
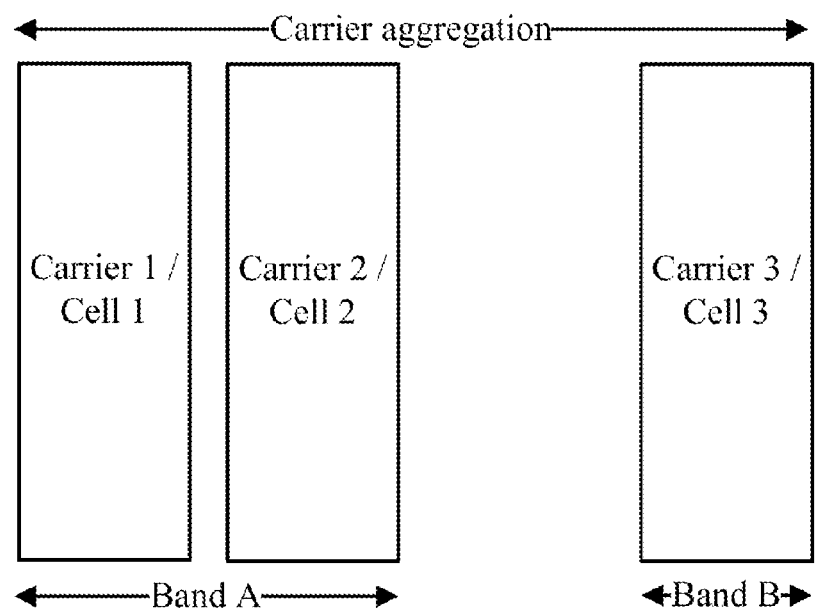
FIG. 2 is a schematic diagram of inter-band carrier aggregation in the prior art.
Figure 3:
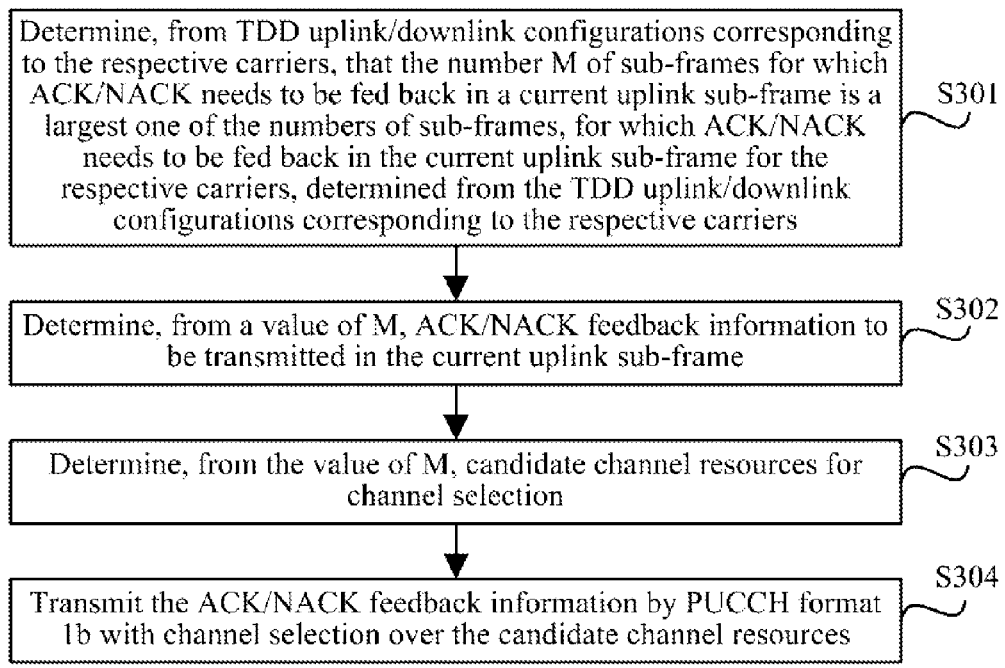
FIG. 3 is a first flow chart of a feedback method of aggregating carriers with different TDD uplink/downlink configurations according to an embodiment of the invention.

As illustrated in FIG. 3, a feedback method of aggregating carriers with different uplink/downlink configurations according to an embodiment of the invention includes:

Operation S301: determine, from Time Division Duplexing, TDD, uplink/downlink configurations corresponding to the respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, where the TDD uplink/downlink configurations, configured in system information, corresponding to each carrier include at least two TDD uplink/downlink configurations, and the TDD uplink/downlink configuration is used for determining a timing relationship for a UE to report ACK/NACK feedback information of the carrier;

Operation S302: determine, from a value of M, ACK/NACK feedback information to be transmitted in the current uplink sub-frame;

Operation S303: determine, from the value of M, candidate channel resources for channel selection; and Operation S304: transmit the ACK/NACK feedback information by PUCCH format 1b with channel selection over the candidate channel resources.

If $M_P$ is the number of sub-frames, for which ACK/NACK needs to be fed back in the current uplink sub-frame for a Primary Component Carrier, PCC, determined from a TDD uplink/downlink configuration corresponding to the Primary Component Carrier, and $M_S$ is the number of sub-frames, for which ACK/NACK needs to be fed back in the current uplink sub-frame for a Secondary Component Carrier, SCC, determined from a TDD uplink/downlink configuration corresponding to Secondary Component Carrier, then M represents a larger one of $M_P$ and $M_S$ in the operation S301. The timing relationship for the UE to report the ACK/NACK feedback information is a correspondence relationship of downlink sub-frames, for which ACK/NACK needs to be fed back, to uplink sub-frames in which ACK/NACK feedbacks of the downlink sub-frames are transmitted.

Particularly the determined number of sub-frames for which ACK/NACK needs to be fed back in the current uplink sub-frame for the carrier is:

The number of sub-frames, in a set of sub-frames over the carrier corresponding to the current uplink sub-frame, determined from the TDD uplink/downlink configuration corresponding to the carrier; or The number of downlink sub-frames, in a set of sub-frames over the carrier corresponding to the current uplink sub-frame, determined from the TDD uplink/downlink configuration corresponding to the carrier; or The number of available downlink sub-frames, in a set of sub-frames over the carrier corresponding to the current uplink sub-frame, determined from the TDD uplink/downlink configuration corresponding to the carrier; or The number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame.

The set of sub-frames over the carrier as referred to in the embodiment of the

Particularly the available downlink sub-frames are downlink sub-frames other than empty downlink sub-frames in the set of sub-frames, and the empty downlink sub-frames include downlink sub-frames in which no scheduling signaling can be obtained and/or downlink sub-frames of which a transmission direction is determined to be uplink.

Particularly $M_P$ represents the number of sub-frames (including all the sub-frames), in the set of sub-frames corresponding to the uplink sub-frame n, determined from the uplink/downlink configuration corresponding to the DL HARQ timing of the PCC, or the number of downlink sub-frames in the set of sub-frames (i.e., other than those sub-frames in the set of sub-frames that are uplink sub-frames over the PCC), or the number of available downlink sub-frames in the set of sub-frame, where the available downlink sub-frames are those in the set of sub-frames over the PCC other than uplink sub-frames and/or downlink sub-frames in which no scheduling information can be obtained and/or downlink sub-frames of which a transmission direction is determined to be uplink (i.e., those sub-frames with different transmission directions over different carriers, also referred to as overlapping sub-frames for which an uplink transmission direction is determined for a semi-Duplexing UE); and particularly the set of sub-frames is a set of sub-frames (sub-frames indexed $n-k_m$, where $0 \leq m \leq M_{P0}-1$), determined from respective elements in a set $$K: \{k_0, k_1, \cdots k_{M_{P0}-1}\}$$

of downlink indexes corresponding to the sub-frame n, in the uplink/downlink configuration corresponding to the DL HARQ timing of the PCC (i.e., the uplink/downlink configuration of the PCC configured in the SIB1 information), where $M_{P0}$ represents the number of elements in the set K of downlink indexes, corresponding to the sub-frame n (i.e., the number of sub-frames in the set of sub-frames), in the uplink/downlink configuration corresponding to the DL HARQ timing of the PCC. Particularly for a full-Duplexing UE, the available downlink sub-frames are downlink sub-frames in the set of sub-frames (sub-frames indexed $n-k_m$, where $0 \leq m \leq M_{P0}-1$) determined from the respective elements in the set K, that is, $M_P$ represents the number of elements in the set K; and for a semi-Duplexing UE, the available downlink sub-frames are other downlink sub-frames, than downlink sub-frames which overlap with an uplink sub-frame over the SCC and which are determined by the UE to operate in the uplink, in the set of sub-frames (sub-frames indexed $n-k_m$, where $0 \leq m \leq M_{P0}-1$), determined from the respective elements in the set K; and if the sub-frame n has no corresponding set K of downlink indexes in the uplink/downlink configuration corresponding to the DL HARQ timing of the PCC, then $M_P=0$.

Likewise, $M_S \geq 0$ and $M_S$ represents the number of sub-frames (including all the sub-frames), in the set of sub-frames corresponding to the uplink sub-frame n, determined from the uplink/downlink configuration corresponding to the DL HARQ timing of the SCC, or the number of downlink sub-frames in the set of sub-frames (i.e., other than those sub-frames in the set of sub-frames that are uplink sub-frames over the SCC), or the number of available downlink sub-frames in the set of sub-frame, where the available downlink sub-frames are those in the set of sub-frames over the SCC other than uplink sub-frames and/or downlink sub-frames in which no scheduling information can be obtained (e.g., when cross carrier scheduling is performed, for those downlink sub-frames, the sub-frames over a scheduling carrier corresponding to the downlink sub-frames are uplink sub-frames and scheduling of multiple sub-frames is not supported) and/or downlink sub-frames of which a transmission direction is determined to be uplink (i.e., those sub-frames with different transmission directions over different carriers, also referred to as overlapping sub-frames for which an uplink transmission direction is determined for a semi-Duplexing UE); and particularly the set of sub-frames is a set of sub-frames (sub-frames indexed $n-k_m$, where $0 \leq m \leq M_{S0}-1$), determined from respective elements in a set $$K: \{k_0, k_1, \cdots k_{M_{S0}-1}\}$$

of downlink indexes corresponding to the sub-frame n, in the uplink/downlink configuration corresponding to the DL HARQ timing of the SCC, where $M_{S0}$ represents the number of elements in the set K of downlink indexes, corresponding to the sub-frame n (i.e., the number of sub-frames in the set of sub-frames), in the uplink/downlink configuration corresponding to the DL HARQ timing of the SCC. Particularly for a full-Duplexing UE, the available downlink sub-frames are downlink sub-frames in the set of sub-frames (sub-frames indexed $n-k_m$, where $0 \le m \le M_{S0}-1$) determined from the respective elements in the set K, or downlink sub-frames in the set of sub-frames other than downlink sub-frames in which no scheduling information can be obtained; and for a semi-Duplexing UE, the available downlink sub-frames are other downlink sub-frames than downlink sub-frames which overlap with an uplink sub-frame over the PCC and which are determined by the UE to operate in the uplink and/or downlink sub-frames in which no scheduling information can be obtained, in the set of sub-frames (sub-frames indexed $n-k_m$, where $0 \le m \le M_{S0}-1$), determined from the respective elements in the set K; and if the sub-frame n has no corresponding set K of downlink indexes in the uplink/downlink configuration corresponding to the DL HARQ timing of the SCC, then $M_S=0$.

The ACK/NACK feedback information to be transmitted in the current uplink sub-frame is determined from the value of M in the operation S302 particularly as follows:

Q*M bits of ACK/NACK feedback information is generated for each downlink carrier, where when M=1 and the downlink carrier is in a multi-codeword transmission mode, Q=2; otherwise, Q=1; that is, when M=1 and the downlink carrier is in a single-codeword transmission mode, Q=1, and when M>1, Q=1.

When the number A of sub-frames for which ACK/NACK needs to be fed back in the current uplink sub-frame, determined from the TDD uplink/downlink configuration corresponding to the downlink carrier, is smaller than the value of M, the ACK/NACK feedback information of the A sub-frames, for which ACK/NACK needs to be fed back in the current uplink sub-frame, corresponding to the downlink carrier is mapped to first Q*A bit locations in a sequence of Q*M bits of ACK/NACK feedback information of the downlink carrier, and Q*(M−A) bits of NACK/DTX is appended to the Q*A bits, where Q bits of NACK/DTX is generated as feedback information for respective sub-frames, in which a Physical Downlink Shared Channel, PDSCH, and/or a Physical Downlink Control Channel, PDCCH, instructing a downlink Semi-Persistent Scheduling, SPS, resource to be released is not received, among the A sub-frames, for which ACK/NACK needs to be fed back in the current uplink sub-frame, corresponding to the downlink carrier.

When $M_S=0$, the ACK/NACK feedback information to be transmitted in the current uplink sub-frame is further determined from the value of M as follows:

M bits of ACK/NACK feedback information corresponding to the PCC is determined as the ACK/NACK feedback information to be transmitted by the UE in the current uplink sub-frame, multi-codeword ACK/NACK feedback information in the same downlink sub-frame over the PCC is spatially bundled, and NACK/DTX is generated as feedback information for respective downlink sub-frames in which a PDSCH, and/or a PDCCH instructing a downlink SPS resource to be released, is not received.

Particularly:

Q*M bits of ACK/NACK feedback information is generated for each downlink carrier, where when M=1 and the downlink carrier is in a multi-codeword transmission mode, Q=2; and when M=1 and the downlink carrier is in a single-codeword transmission mode, or when M>1, Q=1;

NACK/DTX is generated as feedback information for respective downlink sub-frames/codewords, in which no data is received, among the available downlink sub-frames, corresponding to the current uplink sub-frame, in the uplink/downlink configuration corresponding to the downlink HARQ timing of the downlink carrier;

If the sub-frames, for which ACK/NACK feedback information needs to be generated, in the set of sub-frames corresponding to the sub-frame n, determined from the uplink/downlink configuration corresponding to the DL HARQ timing of the downlink carrier, include uplink sub-frames over the carrier and/or downlink sub-frames which overlap with an uplink sub-frame over another carrier and which are determined by the UE to operate in the uplink, then the ACK/NACK feedback information of each sub-frame is mapped into a sequence of feedback information corresponding to the carrier in the order of DAIs corresponding to reception of data over the carrier (that is, ACK/NACK feedback information of the $M_P$ sub-frames over the PCC is mapped into a sequence of feedback information of the UE (for M no larger than 2) or mapped into a sequence of ACK/NACK feedback information corresponding to the PCC (for M larger than 2), and the ACK/NACK feedback information of the $M_S$ sub-frames over the SCC is mapped into the sequence of feedback information of the UE (for M no larger than 2) or mapped into a sequence of ACK/NACK feedback information corresponding to the SCC (for M larger than 2), as described in the Background); or the ACK/NACK feedback information of the available downlink sub-frames over the carrier is mapped preceding to a sequence of feedback information corresponding to the carrier, and the NACK/DTX feedback information generated for the unavailable downlink sub-frames is mapped following the ACK/NACK feedback information of the available downlink sub-frames;

If the number of sub-frames, for which ACK/NACK feedback information needs to be generated, in the set of sub-frames corresponding to the sub-frame n, determined from the uplink/downlink configuration corresponding to the DL HARQ timing of the downlink carrier, is smaller than M, $Q*(M-\min(M_P, M_S))$ pieces of NACK/DTX is appended to the ACK/NACK feedback information of min $(M_P, M_S)$ sub-frames, corresponding to the sub-frame n, in the uplink/downlink configuration corresponding to the DL HARQ timing of the downlink carrier, to constitute the Q*M bits of ACK/NACK feedback information of the downlink carrier, where when M=1 and the downlink carrier is in a multi-codeword transmission mode, Q=2; and when M=1 and the downlink carrier is in a single-codeword transmission mode, or when M>1, Q=1;

Particularly when $M_S=0$, only the M bits of ACK/NACK feedback information corresponding to the PCC can be determined as the ACK/NACK feedback information of the UE corresponding to the sub-frame n, that is, under a single-carrier operating mode, multi-codeword ACK/NACK feedback information in a downlink sub-frame over the PCC is spatially bundled to generate M bits of ACK/NACK feedback information, and NACK/DTX is generated as feedback information for respective downlink sub-frames in which no data is received.

The candidate channel resources for channel selection are determined from the value of M in the operation S303 particularly as follows:

For a PDSCH, with a corresponding PDCCH, transmitted over the PCC and/or a PDCCH, instructing a downlink SPS resource to be released, transmitted over the PCC, a channel resource is determined from the lowest Control Channel Element, CCE, index of the PDCCH, and the channel resource determined at this time is a channel resource corresponding to the PDSCH and/or the PDCCH instructing a downlink SPS resource to be released;

For a PDSCH, transmitted over the PCC, for which there is no corresponding PDCCH and for which ACK/NACK feedback information is mapped to the first one bit in the sequence of ACK/NACK feedback information corresponding to the PCC, then a channel resource is determined from a Transmit Power Control, TPC, field in a PDCCH instructing the PDSCH to be activated, and the channel resource determined at this time is a channel resource corresponding to the PDSCH; where the TPC field indicates one of a plurality of sets of channel resources or one of a plurality of channel resources preconfigured in higher-layer signaling; and For a PDSCH, with a corresponding PDCCH, transmitted over the SCC, a channel resource is determined from a TPC field in the PDCCH (that is, a channel resource is determined from the TPC field in the PDCCH regardless of whether the SCC is cross carrier scheduled); or for a PDSCH, with a corresponding PDCCH, transmitted over the SCC, when the PDCCH is transmitted in the $M_P$ downlink sub-frames over the PCC (when the uplink/downlink configurations corresponding to the DL HARQ timings of the PCC and the SCC are the same, the index of a sub-frame over the PCC in which the PDCCH corresponding to the PDSCH is located is the same as the index of a sub-frame of the PDSCH over the SCC, otherwise, they are different; and at this time a plurality of sub-frames need to be scheduled), a channel resource is determined from the lowest CCE index of the PDCCH, otherwise, a channel resource is determined from a TPC field in the PDCCH; or for a PDSCH, with a corresponding PDCCH, transmitted over the SCC, when $M_P=0$ and $M_S>0$ and the PDCCH is transmitted over the PCC, a channel resource is determined from the lowest CCE index of the PDCCH, otherwise, a channel resource is determined from a TPC field in the PDCCH, and preferably a channel resource is determined from a PDCCH with the DAI value of 1; and the channel resource determined at this time is a channel resource corresponding to the PDSCH, where the TPC field indicates one of a plurality of sets of channel resources or one of a plurality of channel resources preconfigured in higher-layer signaling.

These several schemes of determining a channel resource can be performed concurrently. For example, if there are both a PDSCH, with a corresponding PDCCH, transmitted over the PCC and a PDSCH, with a corresponding PDCCH, transmitted over the SCC, then both a channel resource needs to be determined from the lowest Control Channel Element, CCE, index of the PDCCH and a channel resource needs to be determined from a TPC field in the PDCCH.

When M>2, the channel resource is determined from the lowest CCE index of the PDCCH which is a PDCCH with the DAI value of 1 or a PDCCH with the DAI value of 2.

When $M_S=0$, no more than $M_P$ channel resources are determined only from the lowest CCE indexes of PDCCHs in $M_P$ downlink sub-frames over the PCC.

Particularly the channel resource is determined from the lowest CCE index of the PDCCH as follows:

The channel resource index $n_{PUCCH,j}^{(1)}=(M_{p0}-m-1)\cdot N_c+m\cdot N_{c+1}+n_{CCE,m}+N_{PUCCH}^{(1)}$ is determined;

Where $M_{P0}$ represents the number of elements in a set of downlink indexes $$K:\{k_0,k_1,\cdots k_{M_{P0}-1}\},$$

corresponding to the current uplink sub-frame n, determined from the TDD uplink/downlink configuration configured in the system information corresponding to the PCC, m represents the location index, in the set K, of the downlink index $k_m$ corresponding to the downlink sub-frame $n-k_m$ in which the PDCCH is transmitted over the PCC, $0 \leq m \leq M_{P0}-1$, c represents a value selected from {0, 1, 2, 3} to satisfy $N_c \leq n_{CCE,m} - N_{c+1}$ and $N_c = \max\{0, \lfloor [N_{RB}^{DL} \cdot (N_{sc}^{RB} \cdot c-4)]/36 \rfloor\}$, $N_{RB}^{DL}$ represents an available downlink bandwidth of the PCC in units of Resource Blocks, RBs, $N_{sc}^{RB}$ represents the number of sub-carriers included in an RB, $n_{CCE,m}$ represents the lowest CCE index of the PDCCH, and $N_{PUCCH}^{(1)}$ is a parameter preconfigured in higher-layer signaling.

When the TDD uplink/downlink configuration configured in the system information corresponding to the PCC is the TDD uplink/downlink configuration 0 and $M_S>0$, it is determined that $M_{P0}=1$, m=0. Particularly since there is corresponding $M_P=0$ in the sub-frame 3 and the sub-frame 8 when the TDD uplink/downlink configuration configured in the system information corresponding to the PCC is the configuration 0, if $M_S>0$ at this time, then it can be assumed that $M_{P0}=1$, m=0, and the channel resource can be determined from the lowest CCE index of the selected PDCCH.

The candidate channel resource determined in the operation S303 are PUCCH format 1b resources.

When the ACK/NACK feedback information is transmitted through channel selection over the candidate channel resources in the operation S304, the PUCCH format 1b with channel selection is adopted, particularly as follows:

With the PUCCH format 1b with channel selection, for the uplink sub-frame n over the PCC, 2-bit information b0 and b1, carried by PUCCH format 1b, corresponding to the ACK/NACK feedback information is determined by looking up a corresponding ACK/NACK mapping table according to the ACK/NACK feedback information, channel resources corresponding to respective antenna ports are determined, and b0 and b1 is transmitted by PUCCH format 1b over the channel resources corresponding to the respective antenna ports.

When $M_S=0$ and the ACK/NACK feedback information is transmitted through channel selection over the candidate channel resources, only the ACK/NACK feedback information corresponding to the PCC is transmitted, where the ACK/NACK mapping table is a mapping table in a single-carrier configuration of the TDD system.

Figure 4:
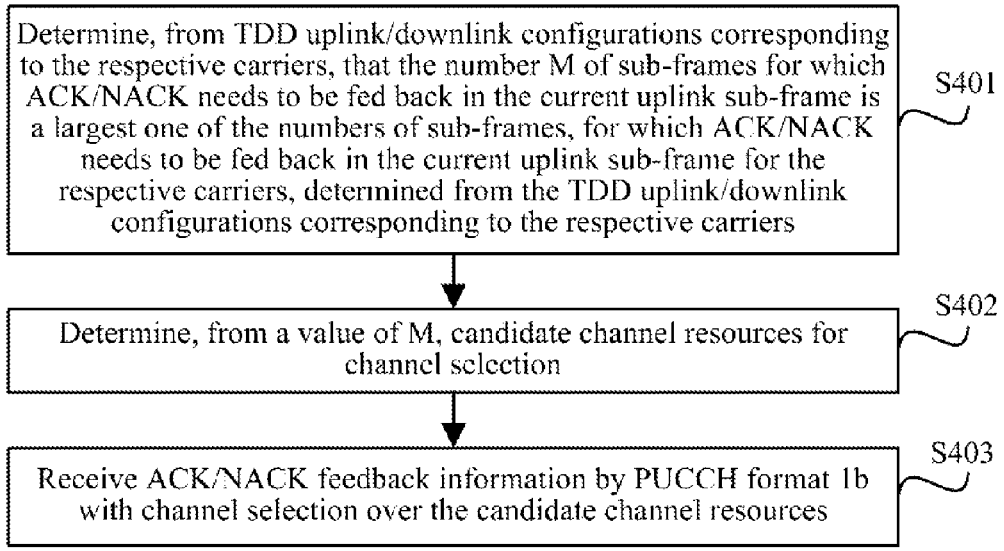
FIG. 4 is a second flow chart of a feedback method of aggregating carriers with different TDD uplink/downlink configurations according to an embodiment of the invention.

An embodiment of the invention further correspondingly provides a feedback method of aggregating carriers with different uplink/downlink configurations at the base station side, and as illustrated in FIG. 4, the method includes:

Operation S401: determine, from Time Division Duplexing, TDD, uplink/downlink configurations corresponding to the respective carriers, that the number M of sub-frames for which ACK/NACK needs to be fed back in the current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, where the TDD uplink/downlink configurations, configured in system information, corresponding to each carrier include at least two TDD uplink/downlink configurations, and the TDD uplink/downlink configuration is used for determining a timing relationship for a base station to receive ACK/NACK feedback information of the carrier;

Operation S402: determine, from a value of M, candidate channel resources for channel selection;

Operation S403: receive ACK/NACK feedback information by PUCCH format 1b with channel selection over the candidate channel resources.

M represents the larger one of $M_P$ and $M_S$, where $M_P$ represents the number of sub-frames, for which ACK/NACK needs to be fed back in the current uplink sub-frame for a Primary Component Carrier, PCC, determined from a TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from a TDD uplink/downlink configuration corresponding to the Secondary Component Carrier; and the timing relationship for the base station to receive the ACK/NACK feedback information is a correspondence relationship of downlink sub-frames, for which ACK/NACK needs to be fed back, to uplink sub-frames in which ACK/NACK feedbacks of the downlink sub-frames are transmitted.

Particularly the determined number of sub-frames for which ACK/NACK needs to be fed back in the current uplink sub-frame for the carrier is:

The number of sub-frames, in a set of sub-frames over the carrier corresponding to the current uplink sub-frame, determined from the TDD uplink/downlink configuration corresponding to the carrier; or The number of downlink sub-frames, in a set of sub-frames over the carrier corresponding to the current uplink sub-frame, determined from the TDD uplink/downlink configuration corresponding to the carrier; or The number of available downlink sub-frames, in a set of sub-frames over the carrier corresponding to the current uplink sub-frame, determined from the TDD uplink/downlink configuration corresponding to the carrier; or The number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame.

Where the set of sub-frames over the carrier is a set of respective sub-frames, over the carrier, determined from respective elements in a set of downlink indexes corresponding to the current uplink sub-frame, determined from the TDD uplink/downlink configuration corresponding to the carrier.

Particularly the available downlink sub-frames are:

Downlink sub-frames in the set of sub-frames other than empty downlink sub-frames, where the empty downlink sub-frames include downlink sub-frames in which no scheduling signaling can be obtained and/or downlink sub-frames of which a transmission direction is determined to be uplink.

The ACK/NACK feedback information is received by PUCCH format 1b with channel selection over the candidate channel resources in the operation S403 which further includes:

Q*M bits of ACK/NACK feedback information corresponding to each downlink carrier is determined, where when M=1 and the downlink carrier is in a multi-codeword transmission mode, Q=2; otherwise, Q=1.

The ACK/NACK feedback information is received by PUCCH format 1b with channel selection over the candidate channel resources which further includes:

When the number A of sub-frames for which ACK/NACK needs to be fed back in the current uplink sub-frame for the downlink carrier, determined from the TDD uplink/downlink configuration corresponding to the downlink carrier, is smaller than the value of M, it is determined that the ACK/NACK feedback information of the A sub-frames, for which ACK/NACK needs to be fed back in the current uplink sub-frame, corresponding to the downlink carrier is mapped to first Q*A bit locations in a sequence of Q*M bits of ACK/NACK feedback information of the downlink carrier.

When $M_S$=0, the ACK/NACK feedback information is received by PUCCH format 1b with channel selection over the candidate channel resources which further includes:

It is determined that the ACK/NACK feedback information is M bits of ACK/NACK feedback information corresponding to the PCC and multi-codeword ACK/NACK feedback information in the same downlink sub-frame over the PCC is spatially bundled.

The candidate channel resources for channel selection is determined from the value of M in the operation S402 as follows:

For a PDSCH, with a corresponding PDCCH, transmitted over the PCC and/or a PDCCH, instructing a downlink SPS resource to be released, transmitted over the PCC, a channel resource is determined from the lowest Control Channel Element, CCE. index of the PDCCH;

For a PDSCH, without any corresponding PDCCH, transmitted over the PCC, a channel resource is determined from a Transmit Power Control, TPC, field in a PDCCH instructing the PDSCH to be activated, where the TPC field indicates one of a plurality of sets of channel resources or one of a plurality of channel resources preconfigured in higher-layer signaling; and For a PDSCH, with a corresponding PDCCH, transmitted over the SCC, a channel resource is determined from a TPC field in the PDCCH; or for a PDSCH, with a corresponding PDCCH, transmitted over the SCC, when the PDCCH is transmitted in an available downlink sub-frame among the $M_P$ sub-frames over the PCC, a channel resource corresponding to the PDSCH is determined from the lowest CCE index of the PDCCH, otherwise, a channel resource is determined from a TPC field in the PDCCH; or for a PDSCH, with a corresponding PDCCH, transmitted over the SCC, when $M_P$=0 and $M_S$>0 and the PDCCH is transmitted over the PCC, a channel resource is determined from the lowest CCE index of the PDCCH, otherwise, a channel resource is determined from a TPC field in the PDCCH; where the TPC field indicates one of a plurality of sets of channel resources or one of a plurality of channel resources preconfigured in higher-layer signaling.

When M>2, the channel resource is determined from the lowest CCE index of the PDCCH which is a PDCCH with the DAI value of 1 or a PDCCH with the DAI value of 2.

When $M_S$=0, no more than $M_P$ channel resources are determined only from the lowest CCE indexes of PDCCHs in $M_P$ downlink sub-frames over the PCC.

Particularly the channel resource is determined from the lowest CCE index of the PDCCH as follows:

The channel resource index $n_{PUCCH,j}^{(1)} = (M_{p0} - m - 1) \cdot N_c + m \cdot N_{c+1} + n_{CCE,m} + N_{PUCCH}^{(1)}$ is determined;

Where $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents the location index, in the set K, of the downlink index $k_m$ corresponding to the downlink sub-frame $n-k_m$ in which the PDCCH is transmitted over the PCC, $0 \leq m \leq M_{P0}-1$, c represents a value selected from $\{0, 1, 2, 3\}$ to satisfy $N_c \leq n_{CCE,m} < N_{c+1}$ and $N_c = \max\{0, \lfloor [N_{RB}^{DL} \cdot (N_{sc}^{RB} \cdot c - 4)]/36 \rfloor\}$, $N_{RB}^{DL}$ represents an available downlink bandwidth of the PCC in units of Resource Blocks, RBs, $N_{sc}^{RB}$ represents the number of sub-carriers included in an RB, $n_{CCE,m}$ represents the lowest CCE index of the PDCCH, and $N_{PUCCH}^{(1)}$ is a parameter preconfigured in higher-layer signaling.

When the TDD uplink/downlink configuration configured in the system information corresponding to the PCC is the TDD uplink/downlink configuration 0 and $M_S>0$, it can be determined that $M_{P0}=1$, m=0.

In the operation S403, alike the ACK/NACK feedback information transmitted from a UE is received through channel selection over the candidate channel resources by PUCCH format 1b with channel selection.

Figure 5:
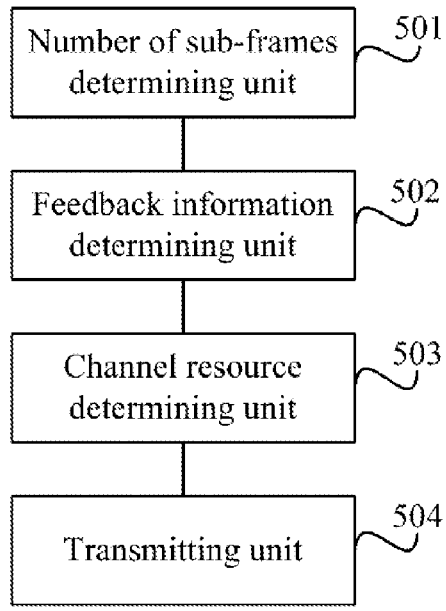
FIG. 5 is a first schematic structural diagram of a feedback apparatus for aggregating carriers with different TDD uplink/downlink configurations according to an embodiment of the invention.

Correspondingly an embodiment of the invention further provides a feedback apparatus for aggregating carriers with different TDD uplink/downlink configurations, where the apparatus can particularly be a UE, as illustrated in FIG. 5, including:

A number of sub-frames determining unit 501 is configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, where the TDD uplink/downlink configurations, configured in system information, corresponding to each carrier include at least two TDD uplink/downlink configurations, and the TDD uplink/downlink configuration is used for determining a relationship for a UE to report ACK/NACK feedback information of carrier;

A feedback information determining unit 502 is configured to determine, from a value of M, ACK/NACK feedback information to be transmitted in the current uplink sub-frame;

A channel resource determining unit 503 is configured to determine, from the value of M, candidate channel resources for channel selection; and A transmitting unit 504 is configured to transmit the ACK/NACK feedback information by PUCCH format 1b with channel selection over the candidate channel resources.

Where M represents a larger one of $M_P$ and $M_S$, $M_P$ represents the number of sub-frames, for which ACK/NACK needs to be fed back in the current uplink sub-frame for a Primary Component Carrier, PCC, determined from a TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from a TDD uplink/downlink configuration corresponding to the Secondary Component Carrier; and the timing relationship for the UE to report the ACK/NACK feedback information is a correspondence relationship of downlink sub-frames, for which ACK/NACK needs to be fed back, to uplink sub-frames in which ACK/NACK feedbacks of the downlink sub-frames are transmitted.

Particularly the determined number of sub-frames for which ACK/NACK needs to be fed back in the current uplink sub-frame for the carrier is:

The number of sub-frames, in a set of sub-frames over the carrier corresponding to the current uplink sub-frame, determined from the TDD uplink/downlink configuration corresponding to the carrier; or The number of downlink sub-frames, in a set of sub-frames over the carrier corresponding to the current uplink sub-frame, determined from the TDD uplink/downlink configuration corresponding to the carrier; or The number of available downlink sub-frames, in a set of sub-frames over the carrier corresponding to the current uplink sub-frame, determined from the TDD uplink/downlink configuration corresponding to the carrier; or The number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame.

Where the set of sub-frames over the carrier is a set of respective sub-frames, over the carrier, determined from respective elements in a set of downlink indexes corresponding to the current uplink sub-frame, determined from the TDD uplink/downlink configuration corresponding to the carrier.

Particularly the available downlink sub-frames are:

Downlink sub-frames other than empty downlink sub-frames in the set of sub-frames, where the empty downlink sub-frames include downlink sub-frames in which no scheduling signaling can be obtained and/or downlink sub-frames of which a transmission direction is determined to be uplink.

The feedback information determination unit 502 is particularly configured:

To generate Q*M bits of ACK/NACK feedback information for each downlink carrier, wherein when M=1 and the downlink carrier is in a multi-codeword transmission mode, Q=2; otherwise, Q=1.

The feedback information determination unit 502 is particularly configured:

When the number A of sub-frames for which ACK/NACK needs to be fed back in the current uplink sub-frame for the downlink carrier, determined from the TDD uplink/downlink configuration corresponding to the downlink carrier, is smaller than the value of M, to map the ACK/NACK feedback information of the A sub-frames, for which ACK/NACK needs to be fed back in the current uplink sub-frame, corresponding to the downlink carrier, to first Q*A bit locations in a sequence of Q*M bits of ACK/NACK feedback information of the downlink carrier, and to append Q*(M−A) bits of NACK/DTX to the Q*A bits, where Q bits of NACK/DTX is generated as feedback information for respective sub-frames, in which a Physical Downlink Shared Channel, PDSCH, and/or a Physical Downlink Control Channel, PDCCH, instructing a downlink Semi-Persistent Scheduling, SPS, resource to be released is not received, among the A sub-frames, for which ACK/NACK needs to be fed back in the current uplink sub-frame, corresponding to the downlink carrier.

When $M_S=0$, the feedback information determination unit 502 is further configured:

To determine M bits of ACK/NACK feedback information corresponding to the PCC as the ACK/NACK feedback information to be transmitted in the current uplink sub-frame, to spatially bundle multi-codeword ACK/NACK feedback information in the same downlink sub-frame over the PCC, and to generate NACK/DTX as feedback information for respective downlink sub-frames in which a PDSCH, and/or a PDCCH instructing a downlink SPS resource to be released, is not received.

The channel resource determining unit 503 is particularly configured:

For a PDSCH, with a corresponding PDCCH, transmitted over the PCC and/or a PDCCH, instructing a downlink SPS resource to be released, transmitted over the PCC, to determine a channel resource from a lowest Control Channel Element, CCE, index of the PDCCH;

For a PDSCH, without any corresponding PDCCH, transmitted over the PCC, to determine a channel resource from a Transmit Power Control, TPC, field in a PDCCH instructing the PDSCH to be activated, where the TPC field indicates one of a plurality of sets of channel resources or one of a plurality of channel resources preconfigured in higher-layer signaling; and For a PDSCH, with a corresponding PDCCH, transmitted over the SCC, to determine a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, to determine a channel resource corresponding to the PDSCH from the lowest CCE index of the PDCCH, otherwise, to determine a channel resource from a TPC field in the PDCCH; or for a PDSCH, with a corresponding PDCCH, transmitted over the SCC, when $M_P=0$ and $M_S>0$ and the PDCCH is transmitted over the PCC, to determine a channel resource from the lowest CCE index of the PDCCH, otherwise, to determine a channel resource from a TPC field in the PDCCH; where the TPC field indicates one of a plurality of sets of channel resources or one of a plurality of channel resources preconfigured in higher-layer signaling.

When $M>2$, the channel resource is determined from the lowest CCE index of the PDCCH which is a PDCCH with a DAI value of 1 or a PDCCH with a DAI value of 2.

When $M_S=0$, to determine no more than $M_P$ channel resources only from the lowest CCE indexes of PDCCHs in $M_P$ downlink sub-frames over the PCC.

The channel resource determining unit 503 configured to determine the channel resource from the lowest CCE index of the PDCCH is particularly configured:

to determine the channel resource index) $n_{PUCCH,j}^{(1)}=(M_{p0}-m-1)\cdot N_c+m\cdot N_{c+1}+n_{CCE,m}+N_{PUCCH}^{(1)}$;

Where $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \le m \le M_{P0}-1$, c represents a value selected from $\{0, 1, 2, 3\}$ to satisfy $N_c \le n_{CCE,m} < N_{c+1}$ and $N_c = \max\{0, \lfloor [N_{RB}^{DL} \cdot (N_{sc}^{RB} \cdot c - 4)]/36 \rfloor\}$, $N_{RB}^{DL}$ represents an available downlink bandwidth of the PCC in units of Resource Blocks, RBs, $N_{sc}^{RB}$ represents the number of sub-carriers included in an RB, $n_{CCE,m}$ represents the lowest CCE index of the PDCCH, and $N_{PUCCH}^{(1)}$ is a parameter preconfigured in higher-layer signaling.

When the TDD uplink/downlink configuration configured in the system information corresponding to the PCC is the TDD uplink/downlink configuration 0 and $M_S>0$, to determine that $M_{P0}=1$, m=0.

Figure 6:
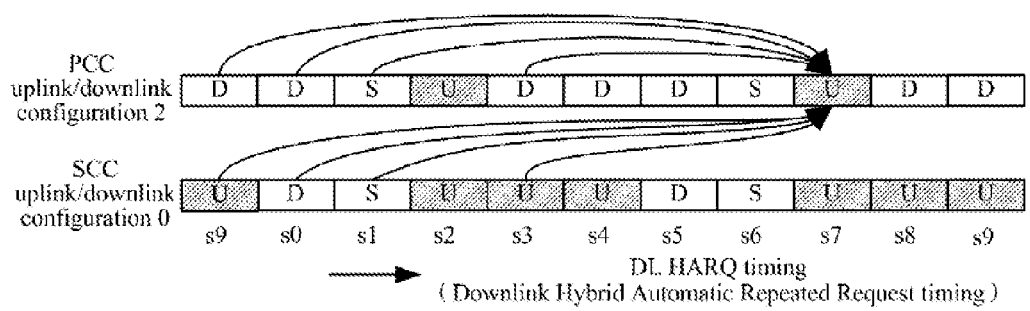
FIG. 6 is a schematic structural diagram of a feedback sub-frame according to an embodiment of the invention.

The following description is given by a particular embodiment:

The uplink/downlink configuration of the PCC configured in the SIB1 information is the configuration 2, while the uplink/downlink configuration of the SCC is the configuration 0, and the DL HARQ timings of the PCC and the SCC correspond to the uplink/downlink configuration 2, as illustrated in FIG. 6, where when the UE transmits ACK/NACK by PUCCH format 1b with channel selection in the sub-frame 7 over the PCC:

In the uplink/downlink configuration 2 corresponding to the DL HARQ timings of the PCC and the SCC, the sub-frame 7 corresponds to a set of downlink indexes K: {8,7,4,6}, and a set of sub-frames corresponding to the elements in the set of downlink indexes are the sub-frames 9, 0, 1 and 3; and for the PCC, available downlink sub-frames in the set of sub-frames are the sub-frames 9, 0, 1 and 3, that is, $M_P=4$, and whereas for the SCC, available downlink sub-frames in the set of sub-frames are the sub-frames 0 and 1, that is, $M_S=2$; so the UE determines that M corresponding to the sub-frame 7 is max $(M_P, M_S)=4$;

The UE further determines 4 bits of ACK/NACK feedback information to be generated for each downlink carrier, where 4 bits of feedback information of the PCC is generated as {HARQ-ACK (0), HARQ-ACK (1), HARQ-ACK (2), HARQ-ACK (3)} in the order of available downlink sub-frames, over the PCC, corresponding to the sub-frame 7; and for the SCC, ACK/NACK feedback information of the sub-frames 0 and 1 is generated in the order of available downlink sub-frames corresponding to the sub-frame 7, and 2 bits of NACK/DTX is appended thereto, thus resulting in {HARQ-ACK (0), HARQ-ACK (1), NACT/DTX, NACT/DTX}.

Two channel resources are determined from the lowest CCEs of PDCCHs with the DAI values of 1 and 2 among PDCCHs with a corresponding PDSCH or PDCCHs instructing downlink SPS resources to be released, transmitted over a corresponding PCC (for transmission over multiple antenna ports (i.e., two antenna ports SORTD), two channel resources are further determined from the lowest CCE indexes+1 of the respective PDCCHs to be applied to the second antenna port) to correspond respectively to $n_{PUCCH,0}^{(1)}$ and $n_{PUCCH,1}^{(1)}$ among four candidate channel resources over each antenna port; and when the SCC is cross carrier scheduled, two channel resources are determined respectively from the lowest CCEs of PDCCHs with the DAI values of 1 and 2 among PDCCHs with corresponding PDSCHs over a corresponding SCC, where in the calculation equation of $n_{PUCCH,j}^{(1)}=(M_{p0}-m-1)\cdot N_c+m\cdot N_{c+1}+n_{CCE,m}+N_{PUCCH}^{(1)}$, $M_{P0}$ represents the number of downlink sub-frames, corresponding to the sub-frame 7, in the uplink/downlink configuration indicated in the SIB1 information of the PCC, that is, $M_{P0}=4$, and the sub-frame 0 over the SCC is the second sub-frame among the $M_{P0}$ sub-frames over the PCC, that is, m=1, and the sub-frame 1 over the SCC is the fourth sub-frame among the $M_{P0}$ sub-frames over the PCC, that is, m=3, whereas when the SCC is self carrier scheduled, a set of channel resources preconfigured in higher-layer signaling (for transmission via a single antenna port, a set of channel resources include two resources, and for transmission via multiple antenna ports (i.e., two antenna ports SORTD), a set of channel resources include four resources) are determined from TPC fields in the PDCCHs with the corresponding PDSCHs over the corresponding SCC to correspond respectively to $n_{PUCCH,2}^{(1)}$ and $n_{PUCCH,3}^{(1)}$ among four candidate channel resources over the each antenna port; or a set of channel resources preconfigured in higher-layer signaling (for transmission via a single antenna port, a set of channel resources include two resources, and for transmission via multiple antenna ports (i.e., two antenna ports SORTD), a set of channel resources include four resources) are determined from TPC fields in the PDCCHs with corresponding PDSCHs over the corresponding SCC to correspond respectively to $n_{PUCCH,2}^{(1)}$ and $n_{PUCCH,3}^{(1)}$ among four candidate channel resources over each antenna port all the time regardless of whether the SCC is cross carrier scheduled.

The UE refers to the ACK/NACK mapping table corresponding to M=4 (Table 10.1.3.2-6) defined in TS 36.213, looks up the table according to the ACK/NACK feedback information of each carrier, selects a channel resource and information b0 and b1 carried by PUCCH format 1b, and transmits b0 and b1 by PUCCH format 1b over the selected channel resource; and The base station side determines M and four channel resources corresponding to the sub-frame 7 in the same way as the UE side, detects information in these four channel resources, looks up the ACK/NACK mapping table corresponding to M=4 (Table 10.1.3.2-6) according to the channel resource index of the detected information and the detected b0 and b1 to retrieve ACK/NACK feedback information of each downlink carrier, and retransmits downlink data as a function of the information.

It shall be noted that in the embodiments above where the ACK/NACK feedback information and the candidate channel resources for channel selection are determined from M, the mapping relationship of the ACK/NACK feedback information of the sub-frames, corresponding to the current uplink sub-frame n, over the respective downlink carriers to its location in the sequence of ACK/NACK feedback information generated by the UE, and the mapping relationship of the determined channel resources to the candidate channel resources for channel selection agree with the PUCCH format 1b with channel selection in the multi-carrier configuration in the Rel-10.

It shall be noted that the methods according to the embodiments above may equally be applicable to a scenario where a TDD carrier and an FDD carrier are aggregated, and the TDD carrier is a PCC and a DL HARQ timing of the FDD carrier corresponds to a TDD uplink/downlink configuration.

Figure 7:
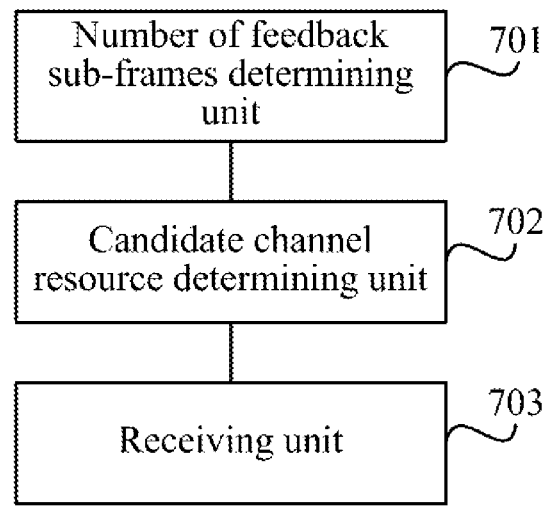
FIG. 7 is a second schematic structural diagram of a feedback apparatus for aggregating carriers with different TDD uplink/downlink configurations according to an embodiment of the invention.

An embodiments of the invention further correspondingly provides a feedback apparatus for aggregating carriers with different uplink/downlink configurations, where the apparatus can particularly be a base station or another network-side device, as illustrated in FIG. 7, including:

A number of feedback sub-frames determining unit 701 is configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, where the TDD uplink/downlink configurations, configured in system information, corresponding to each carrier include at least two TDD uplink/downlink configurations, and the TDD uplink/downlink configuration is used for determining a timing relationship for a base station to receive ACK/NACK feedback information of the carrier;

A candidate channel resource determining unit 702 is configured to determine, from a value of M, candidate channel resources for channel selection; and A receiving unit 703 is configured to receive ACK/NACK feedback information transmitted by a UE by PUCCH format 1b with channel selection over the candidate channel resources.

Where M represents a larger one of $M_P$ and $M_S$, $M_P$ represents the number of sub-frames, for which ACK/NACK needs to be fed back in the current uplink sub-frame for a Primary Component Carrier, PCC, determined from a TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from a TDD uplink/downlink configuration corresponding to the Secondary Component Carrier; and the timing relationship for the base station to receive the ACK/NACK feedback information is a correspondence relationship of downlink sub-frames, for which ACK/NACK needs to be fed back, to uplink sub-frames in which ACK/NACK feedbacks of the downlink sub-frames are transmitted.

Particularly the determined number of sub-frames for which ACK/NACK needs to be fed back in the current uplink sub-frame for the carrier is:

The number of sub-frames, in a set of sub-frames over the carrier corresponding to the current uplink sub-frame, determined from the TDD uplink/downlink configuration corresponding to the carrier; or The number of downlink sub-frames, in a set of sub-frames over the carrier corresponding to the current uplink sub-frame, determined from the TDD uplink/downlink configuration corresponding to the carrier; or The number of available downlink sub-frames, in a set of sub-frames over the carrier corresponding to the current uplink sub-frame, determined from the TDD uplink/downlink configuration corresponding to the carrier; or The number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame.

Where the set of sub-frames over the carrier is a set of respective sub-frames, over the carrier, determined from respective elements in a set of downlink indexes corresponding to the current uplink sub-frame, determined from the TDD uplink/downlink configuration corresponding to the carrier.

Particularly the available downlink sub-frames are:

Downlink sub-frames other than empty downlink sub-frames in the set of sub-frames, where the empty downlink sub-frames include downlink sub-frames in which no scheduling signaling can be obtained and/or downlink sub-frames for which an uplink transmission direction is determined.

The receiving unit 703 is particularly configured:

To determine Q*M bits of ACK/NACK feedback information corresponding to each downlink carrier, wherein when M=1 and the downlink carrier is in a multi-codeword transmission mode, Q=2; otherwise, Q=1.

The receiving unit 703 is particularly configured:

When the number A of sub-frames for which ACK/NACK needs to be fed back in the current uplink sub-frame for the downlink carrier, determined from the TDD uplink/downlink configuration corresponding to the downlink carrier, is smaller than the value of M, to determine that the ACK/NACK feedback information of the A sub-frames, for which ACK/NACK needs to be fed back in the current uplink sub-frame, corresponding to the downlink carrier is mapped to first Q*A bit locations in a sequence of Q*M bits of ACK/NACK feedback information of the downlink carrier.

When $M_S=0$, the receiving unit 703 is further configured:

To determine that the ACK/NACK feedback information is M bits of ACK/NACK feedback information corresponding to the PCC and multi-codeword ACK/NACK feedback information in the same downlink sub-frame over the PCC is spatially bundled.

The candidate channel resource determining unit 702 is particularly configured:

For a PDSCH, with a corresponding PDCCH, transmitted over the PCC and/or a PDCCH, instructing a downlink SPS resource to be released, transmitted over the PCC, to determine a channel resource from a lowest Control Channel Element, CCE, index of the PDCCH;

For a PDSCH, without any corresponding PDCCH, transmitted over the PCC, to determine a channel resource from a Transmit Power Control, TPC, field in a PDCCH instructing the PDSCH to be activated, where the TPC field indicates one of a plurality of sets of channel resources or one of a plurality of channel resources preconfigured in higher-layer signaling; and For a PDSCH, with a corresponding PDCCH, transmitted over the SCC, to determine a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, to determine a channel resource corresponding to the PDSCH from the lowest CCE index of the PDCCH, otherwise, to determine a channel resource from a TPC field in the PDCCH; or for a PDSCH, with a corresponding PDCCH, transmitted over the SCC, when $M_P=0$ and $M_S>0$ and the PDCCH is transmitted over the PCC, to determine a channel resource from the lowest CCE index of the PDCCH, otherwise, to determine a channel resource from a TPC field in the PDCCH, where the TPC field indicates one of a plurality of sets of channel resources or one of a plurality of channel resources preconfigured in higher-layer signaling.

When M>2, the candidate channel resource determining unit 702 is configured to determine the channel resource from the lowest CCE index of the PDCCH which is a PDCCH with the DAI value of 1 or a PDCCH with the DAI value of 2.

When $M_S=0$, the candidate channel resource determining unit 702 is further configured to determine no more than $M_P$ channel resources only from the lowest CCE indexes of PDCCHs in $M_P$ downlink sub-frames over the PCC.

The candidate channel resource determining unit 702 configured to determine the channel resource from the lowest CCE index of the PDCCH is particularly configured:

To determine the channel resource index $n_{PUCCH,j}^{(1)} = (M_{p0}-m-1) \cdot N_c + m \cdot N_{c+1} + n_{CCE,m} + N_{PUCCH}^{(1)}$;

Where $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \leq m \leq M_{P0}-1$, c represents a value selected from $\{0, 1, 2, 3\}$ to satisfy $N_c \leq n_{CCE,m} < N_{c+1}$ and $N_c = \max\{0, \lfloor[N_{RB}^{DL} \cdot (N_{sc}^{RB} \cdot c-4)]/36\rfloor\}$, $N_{RB}^{DL}$ an available downlink bandwidth of the PCC in units of Resource Blocks, RBs, $N_{sc}^{RB}$ represents the number of sub-carriers included in an RB, $n_{CCE,m}$ represents the lowest CCE index of the PDCCH, and $N_{PUCCH}^{(1)}$ is a parameter preconfigured in higher-layer signaling.

The candidate channel resource determining unit 702 configured to the channel resource is determined from the lowest CCE index of the PDCCH is further configured, when the TDD uplink/downlink configuration configured in the system information corresponding to the PCC is the TDD uplink/downlink configuration 0 and $M_S>0$, to determine that $M_{P0}=1$, m=0.

Figure 8:
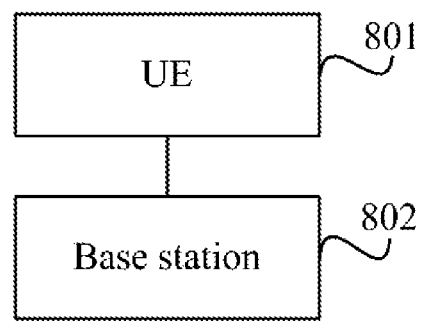
FIG. 8 is a schematic structural diagram of a feedback system for aggregating carriers with different TDD uplink/downlink configurations according to an embodiment of the invention.

An embodiment of the invention further provides a feedback system for aggregating carriers with different uplink/downlink configurations as illustrated in FIG. 8 including:

A UE 801 is configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, where the TDD uplink/downlink configurations, configured in system information, corresponding to each carrier include at least two TDD uplink/downlink configurations, and the TDD uplink/downlink configuration is used for determining a timing relationship for a UE to report ACK/NACK feedback information of the respective carriers are determined; to determine, from a value of M, ACK/NACK feedback information to be transmitted in the current uplink sub-frame; to determine, from the value of M, candidate channel resources for channel selection; and to transmit the ACK/NACK feedback information by PUCCH format 1b with channel selection over the candidate channel resources; and A base station is configured to determine, from TDD uplink/downlink configurations corresponding to respective carriers, that the number M of sub-frames for which ACK/NACK needs to be fed back in the current uplink sub-frame is a largest one of the numbers of sub-frames, for which ACK/NACK needs to be fed back in the current uplink sub-frame for the respective carriers, determined from the TDD uplink/downlink configurations corresponding to the respective carriers; to determine, from the value of M, the candidate channel resources for channel selection; and to receive the ACK/NACK feedback information by PUCCH format 1b with channel selection over the candidate channel resources.

The embodiments of the invention provide a feedback method of and apparatus and system for aggregating carriers with different uplink/downlink configurations, where the number M of sub-frames for which ACK/NACK needs to be fed back in the current uplink sub-frame is determined from TDD uplink/downlink configurations, corresponding to the respective carriers, by which timing relationships for a UE to report ACK/NACK feedback information of the carriers are determined, and ACK/NACK feedback information transmitted by the UE in the current uplink sub-frame and candidate channel resources for channel selection are further determined from the value of M, and furthermore the ACK/NACK feedback information is transmitted by PUCCH format 1b with channel selection over the candidate channel resources.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A feedback method of aggregating carriers, comprising:
    determining, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to respective carriers comprise at least two TDD uplink/downlink configurations, or the respective carriers comprise at least one Frequency Division Duplexing, FDD, carrier and at least one TDD carrier, and the TDD uplink/downlink configuration is used for determining a timing relationship for a User Equipment, UE, to report ACK/NACK feedback information of the carrier;
    determining, from a value of M, ACK/NACK feedback information to be transmitted in the current uplink sub-frame;
    determining, from the value of M, candidate channel resources for channel selection; and
    transmitting the ACK/NACK feedback information by PUCCH format 1b with channel selection over the candidate channel resources.

2. The method according to claim 1, wherein M represents a larger one of $M_P$ and $M_S$,
    $M_P$ represents the number of sub-frames, for which ACK/NACK needs to be fed back in the current uplink sub-frame for a Primary Component Carrier, PCC, determined from the TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from the TDD uplink/downlink configuration corresponding to the Secondary Component Carrier; and the number of sub-frames for which ACK/NACK needs to be fed back in the current uplink sub-frame for the carrier is: the number of sub-frames, in a set of sub-frames over the carrier corresponding to the current uplink sub-frame, determined from the TDD uplink/downlink configuration corresponding to the carrier; or the number of downlink sub-frames, in a set of sub-frames over the carrier corresponding to the current uplink sub-frame, determined from the TDD uplink/downlink configuration corresponding to the carrier; or the number of other downlink sub-frames than downlink sub-frames in which no scheduling signaling can be obtained and/or downlink sub-frames of which a transmission direction is determined to be uplink, in a set of sub-frames over the carrier corresponding to the current uplink sub-frame, determined from the TDD uplink/downlink configuration corresponding to the carrier; or the number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame; wherein the set of sub-frames over the carrier is a set of respective sub-frames over the carrier, determined from respective elements in a set of downlink indexes corresponding to the current uplink sub-frame, determined from the TDD uplink/downlink configuration corresponding to the carrier; and the timing relationship for the UE to report the ACK/NACK feedback information is a correspondence relationship of downlink sub-frames, for which ACK/NACK needs to be fed back, to uplink sub-frames in which ACK/NACK feedbacks of the downlink sub-frames are transmitted.

3. The method according to claim 1, wherein the determining from the value of M the ACK/NACK feedback information to be transmitted in the current uplink sub-frame particularly comprises:

generating Q*M bits of ACK/NACK feedback information for each downlink carrier, wherein when M=1 and the downlink carrier is in a multi-codeword transmission mode, Q=2; otherwise, Q=1; and when the number A of sub-frames for which ACK/NACK needs to be fed back in the current uplink sub-frame for the downlink carrier, determined from the TDD uplink/downlink configuration corresponding to the downlink carrier, is smaller than the value of M, mapping the ACK/NACK feedback information of the A sub-frames, for which ACK/NACK needs to be fed back in the current uplink sub-frame, corresponding to the downlink carrier, to first Q*A bit locations in a sequence of Q*M bits of ACK/NACK feedback information of the downlink carrier, and appending Q*(M−A) bits of NACK/DTX to the Q*A bits, wherein Q bits of NACK/DTX is generated as feedback information for respective sub-frames, in which a Physical Downlink Shared Channel, PDSCH, and/or a Physical Downlink Control Channel, PDCCH, instructing a downlink Semi-Persistent Scheduling, SPS, resource to be released is not received, among the A sub-frames, for which ACK/NACK needs to be fed back in the current uplink sub-frame, corresponding to the downlink carrier.

4. The method according to claim 1, wherein the determining from the value of M the candidate channel resources for channel selection particularly comprises:

for a PDSCH, with a corresponding PDCCH, transmitted over a PCC and/or a PDCCH, instructing a downlink SPS resource to be released, transmitted over the PCC, determining a channel resource from a lowest Control Channel Element, CCE, index of the PDCCH;

for a PDSCH, without any corresponding PDCCH, transmitted over the PCC, determining a channel resource from a Transmit Power Control, TPC, field in a PDCCH instructing the PDSCH to be activated, wherein the TPC field indicates one of a plurality of sets of channel resources or one of a plurality of channel resources preconfigured in higher-layer signaling; and for a PDSCH, with a corresponding PDCCH, transmitted over a SCC, determining a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, determining a channel resource from the lowest CCE index of the PDCCH, otherwise, determining a channel resource from a TPC field in the PDCCH; or for a PDSCH, with a corresponding PDCCH, transmitted over the SCC, when $M_P=0$ and $M_S>0$ and the PDCCH is transmitted over the PCC, determining a channel resource from the lowest CCE index of the PDCCH, otherwise, determining a channel resource from a TPC field in the PDCCH; wherein the TPC field indicates one of a plurality of sets of channel resources or one of a plurality of channel resources preconfigured in higher-layer signaling; and wherein when M>2, the channel resource is determined from the lowest CCE index of the PDCCH which is a PDCCH with a Downlink Assignment index, DAI, value of 1 or a PDCCH with a DAI value of 2.

5. The method according to claim 4, wherein the determining the channel resource from the lowest CCE index of the PDCCH particularly comprises:

determining the channel resource index $n_{PUCCH,j}^{(1)} = (M_{p0}-m-1) \cdot N_c + m \cdot N_{c+1} + n_{CCE,m} + N_{PUCCH}^{(1)}$; wherein $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \le m \le M_{P0}-1$, c represents a value selected from $\{0, 1, 2, 3\}$ to $N_c \le n_{CCE,m} < N_{c+1}$ and $N_c = \max\{0, \lfloor [N_{RB}^{DL} \cdot (N_{sc}^{RB} \cdot c-4)]/36 \rfloor\}$, $N_{RB}^{DL}$ represents an available downlink bandwidth of the PCC in units of Resource Blocks, RBs, $N_{sc}^{RB}$ represents the number of sub-carriers comprised in an RB $n_{CCE,m}$ represents the lowest CCE index of the PDCCH, and $N_{PUCCH}^{(1)}$ is a parameter preconfigured in higher-layer signaling.

6. A feedback method of aggregating carriers, comprising:

determining, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to respective carriers comprise at least two TDD uplink/downlink configurations, or the respective carriers comprise at least one Frequency Division Duplexing, FDD, carrier and at least one TDD carrier, and the TDD uplink/downlink configuration is used for determining a timing relationship for a base station to receive ACK/NACK feedback information of the carrier;

determining, from a value of M, candidate channel resources for channel selection; and receiving ACK/NACK feedback information by PUCCH format 1b with channel selection over the candidate channel resources.

7. The method according to claim 6, wherein M represents a larger one of $M_P$ and $M_S$, $M_P$ represents the number of sub-frames, for which ACK/NACK needs to be fed back in the current uplink sub-frame for a Primary Component Carrier, PCC, determined from the TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from the TDD uplink/downlink configuration corresponding to the Secondary Component Carrier; and the number of sub-frames for which ACK/NACK needs to be fed back in the current uplink sub-frame for the carrier is: the number of sub-frames, in a set of sub-frames over the carrier corresponding to the current uplink sub-frame, determined from the TDD uplink/downlink configuration corresponding to the carrier; or the number of downlink sub-frames, in a set of sub-frames over the carrier corresponding to the current uplink sub-frame, determined from the TDD uplink/downlink configuration corresponding to the carrier; or the number of other downlink sub-frames than downlink sub-frames in which no scheduling signaling can be obtained and/or downlink sub-frames of which a transmission direction is determined to be uplink, in a set of sub-frames over the carrier corresponding to the current uplink sub-frame, determined from the TDD uplink/downlink configuration corresponding to the carrier; or the number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame; wherein the set of sub-frames over the carrier is a set of respective sub-frames over the carrier, determined from respective elements in a set of downlink indexes corresponding to the current uplink sub-frame, determined from the TDD uplink/downlink configuration corresponding to the carrier; and the timing relationship for the base station to receive the ACK/NACK feedback information is a correspondence relationship of downlink sub-frames, for which ACK/NACK needs to be fed back, to uplink sub-frames in which ACK/NACK feedbacks of the downlink sub-frames are transmitted.

8. The method according to claim 6, wherein the receiving the ACK/NACK feedback information by PUCCH format 1b with channel selection over the candidate channel resources further comprises:
determining Q*M bits of ACK/NACK feedback information corresponding to each downlink carrier, wherein when M=1 and the downlink carrier is in a multi-codeword transmission mode, Q=2; otherwise, Q=1; and
when the number A of sub-frames for which ACK/NACK needs to be fed back in the current uplink sub-frame for the downlink carrier, determined from the TDD uplink/downlink configuration corresponding to the downlink carrier, is smaller than the value of M, determining that the ACK/NACK feedback information of the A sub-frames, for which ACK/NACK needs to be fed back in the current uplink sub-frame, corresponding to the downlink carrier is mapped to first Q*A bit locations in a sequence of Q*M bits of ACK/NACK feedback information of the downlink carrier.

9. The method according to claim 6, wherein the determining from the value of M the candidate channel resources for channel selection particularly comprises:
for a PDSCH, with a corresponding PDCCH, transmitted over a PCC and/or a PDCCH, instructing a downlink SPS resource to be released, transmitted over the PCC, determining a channel resource from a lowest Control Channel Element, CCE, index of the PDCCH;
for a PDSCH, without any corresponding PDCCH, transmitted over the PCC, determining a channel resource from a Transmit Power Control, TPC, field in a PDCCH instructing the PDSCH to be activated, wherein the TPC field indicates one of a plurality of sets of channel resources or one of a plurality of channel resources preconfigured in higher-layer signaling; and
for a PDSCH, with a corresponding PDCCH, transmitted over a SCC, determining a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, determining a channel resource from the lowest CCE index of the PDCCH, otherwise, determining a channel resource from a TPC field in the PDCCH; or for a PDSCH, with a corresponding PDCCH, transmitted over the SCC, when $M_P$=0 and $M_S$>0 and the PDCCH is transmitted over the PCC, determining a channel resource from the lowest CCE index of the PDCCH, otherwise, determining a channel resource from a TPC field in the PDCCH; wherein the TPC field indicates one of a plurality of sets of channel resources or one of a plurality of channel resources preconfigured in higher-layer signaling; and
wherein when M>2, the channel resource is determined from the lowest CCE index of the PDCCH which is a PDCCH with a DAI value of 1 or a PDCCH with a Downlink Assignment index, DAI, value of 2.

10. The method according to claim 9, wherein the determining the channel resource from the lowest CCE index of the PDCCH particularly comprises:
determining the channel resource index $$n_{PUCCH,j}^{(1)} = (M_{p0}-m-1) \cdot N_c + m \cdot N_{c+1} + n_{CCE,m} + N_{PUCCH}^{(1)};$$

wherein $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \leq m \leq M_{P0}-1$, c represents a value selected from $\{0, 1, 2, 3\}$ to satisfy $N_c \leq n_{CCE,m} < N_{c+1}$ and $N_c = \max\{0, \lfloor [N_{RB}^{DL} \cdot (N_{sc}^{RB} \cdot c - 4)]/36 \rfloor\} N_{RB}^{DL}$ represents an available downlink bandwidth of the PCC in units of Resource Blocks, RBs, $N_{sc}^{RB}$ represents the number of sub-carriers comprised in an RB, $n_{CCE,m}$ represents the lowest CCE index of the PDCCH, and $N_{PUCCH}^{(1)}$ is a parameter preconfigured in higher-layer signaling.

11. A feedback apparatus for aggregating carriers, comprising:
a processor configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to the each carrier comprise at least two TDD uplink/downlink configurations, or the respective carriers comprise at least one Frequency Division Duplexing, FDD, carrier and at least one TDD carrier, and the TDD uplink/downlink configuration is used for determining a relationship for a UE to report ACK/NACK feedback information of the carrier;
the processor configured to determine, from a value of M, ACK/NACK feedback information to be transmitted in the current uplink sub-frame; and
to determine, from the value of M, candidate channel resources for channel selection; and
a transmitter configured to transmit the ACK/NACK feedback information by PUCCH format 1b with channel selection over the candidate channel resources.

12. The apparatus according to claim 11, wherein M represents a larger one of $M_P$ and $M_S$,
$M_P$ represents the number of sub-frames, for which ACK/NACK needs to be fed back in the current uplink sub-frame for a Primary Component Carrier, PCC, determined from the TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from the TDD uplink/downlink configuration corresponding to the Secondary Component Carrier; and the number of sub-frames for which ACK/NACK needs to be fed back in the current uplink sub-frame for the carrier is: the number of sub-frames, in a set of sub-frames over the carrier corresponding to the current uplink sub-frame, determined from the TDD uplink/downlink configuration corresponding to the carrier; or the number of downlink sub-frames, in a set of sub-frames over the carrier corresponding to the current uplink sub-frame, determined from the TDD uplink/downlink configuration corresponding to the carrier; or the number of other downlink sub-frames than downlink sub-frames in which no scheduling signaling can be obtained and/or downlink sub-frames of which a transmission direction is determined to be uplink, in a set of sub-frames over the carrier corresponding to the current uplink sub-frame, determined from the TDD uplink/downlink configuration corresponding to the carrier; or the number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame; wherein the set of sub-frames over the carrier is a set of respective sub-frames over the carrier, determined from respective elements in a set of downlink indexes corresponding to the current uplink sub-frame, determined from the TDD uplink/downlink configuration corresponding to the carrier; and
the timing relationship for the UE to report the ACK/NACK feedback information is a correspondence relationship of downlink sub-frames, for which ACK/NACK needs to be fed back, to uplink sub-frames in which ACK/NACK feedbacks of the downlink sub-frames are transmitted.

13. The apparatus according to claim 11, wherein the processor is particularly configured:
to generate Q*M bits of ACK/NACK feedback information for each downlink carrier, wherein when M=1 and the downlink carrier is in a multi-codeword transmission mode, Q=2; otherwise, Q=1; and
when the number A of sub-frames for which ACK/NACK needs to be fed back in the current uplink sub-frame for the downlink carrier, determined from the TDD uplink/downlink configuration corresponding to the downlink carrier, is smaller than the value of M, to map the ACK/NACK feedback information of the A sub-frames, for which ACK/NACK needs to be fed back in the current uplink sub-frame, corresponding to the downlink carrier, to first Q*A bit locations in a sequence of Q*M bits of ACK/NACK feedback information of the downlink carrier, and to append Q*(M−A) bits of NACK/DTX to the Q*A bits, wherein Q bits of NACK/DTX is generated as feedback information for respective sub-frames, in which a Physical Downlink Shared Channel, PDSCH, and/or a Physical Downlink Control Channel, PDCCH, instructing a downlink Semi-Persistent Scheduling, SPS, resource to be released is not received, among the A sub-frames, for which ACK/NACK needs to be fed back in the current uplink sub-frame, corresponding to the downlink carrier.

14. The apparatus according to claim 11, wherein the processor is particularly configured:
for a PDSCH, with a corresponding PDCCH, transmitted over a PCC and/or a PDCCH, instructing a downlink SPS resource to be released, transmitted over the PCC, to determine a channel resource from a lowest Control Channel Element, CCE, index of the PDCCH;
for a PDSCH, without any corresponding PDCCH, transmitted over the PCC, to determine a channel resource from a Transmit Power Control, TPC, field in a PDCCH instructing the PDSCH to be activated, wherein the TPC field indicates one of a plurality of sets of channel resources or one of a plurality of channel resources preconfigured in higher-layer signaling; and
for a PDSCH, with a corresponding PDCCH, transmitted over a SCC, to determine a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, to determine a channel resource from the lowest CCE index of the PDCCH, otherwise, to determine a channel resource from a TPC field in the PDCCH; or for a PDSCH, with a corresponding PDCCH, transmitted over the SCC, when $M_P$=0 and $M_S$>0 and the PDCCH is transmitted over the PCC, to determine a channel resource from the lowest CCE index of the PDCCH, otherwise, to determine a channel resource from a TPC field in the PDCCH; wherein the TPC field indicates one of a plurality of sets of channel resources or one of a plurality of channel resources preconfigured in higher-layer signaling; and wherein when M>2, the channel resource is determined from the lowest CCE index of the PDCCH which is a PDCCH with a Downlink Assignment index, DAI, value of 1 or a PDCCH with a DAI value of 2.

15. The apparatus according to claim 11, wherein the processor configured to determine the channel resource from the lowest CCE index of the PDCCH is particularly configured:
to determine the channel resource index $$n_{PUCCH,j}^{(1)} = (M_{p0}-m-1) \cdot N_c + m \cdot N_{c+1} + n_{CCE,m} + N_{PUCCH}^{(1)};$$

wherein $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \leq m \leq M_{P0}-1$, c represents a value selected from $\{0, 1, 2, 3\}$ to satisfy $N_c \leq n_{CCE,m} < N_{c+1}$ and $N_c = \max\{0, \lfloor [N_{RB}^{DL} \cdot (N_{sc}^{RB} \cdot c-4)]/36 \rfloor\}$, $N_{RB}^{DL}$ represents an available downlink bandwidth of the PCC in units of Resource Blocks, RBs, $N_{sc}^{RB}$ represents the number of sub-carriers comprised in an RB, $n_{CCE,m}$ represents the lowest CCE index of the PDCCH, and $N_{PUCCH}^{(1)}$ is a parameter preconfigured in higher-layer signaling.

16. A feedback apparatus for aggregating carriers, comprising:
a processor configured to determine, from Time Division Duplexing, TDD, uplink/downlink configurations corresponding to respective carriers, that the number M of sub-frames for which ACK/NACK needs to be fed back in a current uplink sub-frame is a largest one of the numbers of sub-frames, for which ACK/NACK needs to be fed back in the current uplink sub-frame for the respective carriers, determined from the TDD uplink/downlink configurations corresponding to the respective carriers, wherein the TDD uplink/downlink configurations, configured in system information, corresponding to each carrier comprise at least two TDD uplink/downlink configurations, or the respective carriers comprise at least one Frequency Division Duplexing, FDD, carrier and at least one TDD carrier, and the TDD uplink/downlink configuration is used for determining a timing relationship for a base station to receive ACK/NACK feedback information of the carrier;
and the processor configured to determine, from a value of M, candidate channel resources for channel selection; and
a receiver configured to receive ACK/NACK feedback information by PUCCH format 1b with channel selection over the candidate channel resources.

17. The apparatus according to claim 16, wherein M represents a larger one of $M_P$ and $M_S$,
$M_P$ represents the number of sub-frames, for which ACK/NACK needs to be fed back in the current uplink sub-frame for a Primary Component Carrier, PCC, determined from the TDD uplink/downlink configuration corresponding to the Primary Component Carrier, and $M_S$ represents the number of sub-frames, for which ACK/NACK needs to be fed back in the current uplink sub-frame for a Secondary Component Carrier, SCC, determined from the TDD uplink/downlink configuration corresponding to the Secondary Component Carrier; and the number of sub-frames for which ACK/NACK needs to be fed back in the current uplink sub-frame for the carrier is: the number of sub-frames, in a set of sub-frames over the carrier corresponding to the current uplink sub-frame, determined from the TDD uplink/downlink configuration corresponding to the carrier; or the number of downlink sub-frames, in a set of sub-frames over the carrier corresponding to the current uplink sub-frame, determined from the TDD uplink/downlink configuration corresponding to the carrier; or the number of other downlink sub-frames than downlink sub-frames in which no scheduling signaling can be obtained and/or downlink sub-frames of which a transmission direction is determined to be uplink, in a set of sub-frames over the carrier corresponding to the current uplink sub-frame, determined from the TDD uplink/downlink configuration corresponding to the carrier; or the number of sub-frames for which ACK/NACK needs to be fed back in the current uplink sub-frame for the carrier is 0 when it is determined from the TDD uplink/downlink configuration corresponding to the carrier that there is no set of downlink indexes corresponding to the current uplink sub-frame; wherein the set of sub-frames over the carrier is a set of respective sub-frames over the carrier, determined from respective elements in a set of downlink indexes corresponding to the current uplink sub-frame, determined from the TDD uplink/downlink configuration corresponding to the carrier; and
the timing relationship for the base station to receive the ACK/NACK feedback information is a correspondence relationship of downlink sub-frames, for which ACK/NACK needs to be fed back, to uplink sub-frames in which ACK/NACK feedbacks of the downlink sub-frames are transmitted.

18. The apparatus according to claim 16, wherein the receiver is particularly configured:
to determine Q*M bits of ACK/NACK feedback information corresponding to each downlink carrier, wherein when M=1 and the downlink carrier is in a multi-codeword transmission mode, Q=2; otherwise, Q=1; and
when the number A of sub-frames for which ACK/NACK needs to be fed back in the current uplink sub-frame for the downlink carrier, determined from the TDD uplink/downlink configuration corresponding to the downlink carrier, is smaller than the value of M, to determine that the ACK/NACK feedback information of the A sub-frames, for which ACK/NACK needs to be fed back in the current uplink sub-frame, corresponding to the downlink carrier is mapped to first Q*A bit locations in a sequence of Q*M bits of ACK/NACK feedback information of the downlink carrier.

19. The apparatus according to claim 16, wherein the processor is particularly configured:
for a PDSCH, with a corresponding PDCCH, transmitted over a PCC and/or a PDCCH, instructing a downlink SPS resource to be released, transmitted over the PCC, to determine a channel resource from a lowest Control Channel Element, CCE, index of the PDCCH;

for a PDSCH, without any corresponding PDCCH, transmitted over the PCC, to determine a channel resource from a Transmit Power Control, TPC, field in a PDCCH instructing the PDSCH to be activated, wherein the TPC field indicates one of a plurality of sets of channel resources or one of a plurality of channel resources preconfigured in higher-layer signaling; and for a PDSCH, with a corresponding PDCCH, transmitted over a SCC, to determine a channel resource from a TPC field in the PDCCH; or for a PDSCH, with a corresponding PDCCH, transmitted over the SCC, when the PDCCH is transmitted in an available downlink sub-frame among the $M_P$ sub-frames over the PCC, to determine a channel resource corresponding to the PDSCH from the lowest CCE index of the PDCCH, otherwise, to determine a channel resource from a TPC field in the PDCCH; or for a PDSCH, with a corresponding PDCCH, transmitted over the SCC, when $M_P=0$ and $M_S>0$ and the PDCCH is transmitted over the PCC, to determine a channel resource from the lowest CCE index of the PDCCH, otherwise, to determine a channel resource from a TPC field in the PDCCH, wherein the TPC field indicates one of a plurality of sets of channel resources or one of a plurality of channel resources preconfigured in higher-layer signaling.

20. The apparatus according to claim 19, wherein the processor configured to determine the channel resource from the lowest CCE index of the PDCCH is particularly configured:

to determine the channel resource index $$n_{PUCCH,j}^{(1)} = (M_{P0}-m-1) \cdot N_c + m \cdot N_{c+1} + n_{CCE,m} + N_{PUCCH}^{(1)};$$

wherein $M_{P0}$ represents the number of elements in a set of downlink indexes $$K: \{k_0, k_1, \cdots k_{M_{P0}-1}\},$$

corresponding to the current uplink sub-frame n, determined from the TDD uplink/downlink configuration configured in the system information corresponding to the PCC, m represents a location index, in the set K, of the downlink index $k_m$ corresponding to the downlink sub-frame $n-k_m$ in which the PDCCH is transmitted over the PCC, $0 \le m \le M_{P0}-1$, c represents a value selected from $\{0, 1, 2, 3\}$ to satisfy $N_c \le n_{CCE,m} < N_{c+1}$ and $N_c = \max\{0, \lfloor [N_{RB}^{DL} \cdot (N_{sc}^{RB} \cdot c - 4)]/36 \rfloor\}$, $N_{RB}^{DL}$ represents an available downlink bandwidth of the PCC in units of Resource Blocks, RBs, $N_{sc}^{RB}$ represents the number of sub-carriers comprised in an RB, $n_{CCE,m}$ represents the lowest CCE index of the PDCCH, and $N_{PUCCH}^{(1)}$ is a parameter preconfigured in higher-layer signaling.

\* \* \* \* \*